United States Patent
Townley et al.

(10) Patent No.: US 9,855,498 B2
(45) Date of Patent: *Jan. 2, 2018

(54) GAME CONTROLLER WITH STRUCTURAL BRIDGE

(71) Applicant: Wikipad, Inc., Simi Valley, CA (US)

(72) Inventors: Fraser Townley, Pembroke, MA (US); Kelly D. Gamble, Simi Valley, CA (US)

(73) Assignee: Wikipad, Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,171

(22) Filed: Jul. 28, 2017

(65) Prior Publication Data

US 2017/0326448 A1    Nov. 16, 2017

Related U.S. Application Data

(63) Continuation of application No. 15/457,571, filed on Mar. 13, 2017, now Pat. No. 9,757,649, which is a (Continued)

(51) Int. Cl.
*A63F 9/24* (2006.01)
*A63F 13/24* (2014.01)
(Continued)

(52) U.S. Cl.
CPC ............... *A63F 13/24* (2014.09); *A63F 9/24* (2013.01); *A63F 13/20* (2014.09);
(Continued)

(58) Field of Classification Search
None
See application file for complete search history.

(56) References Cited

U.S. PATENT DOCUMENTS 4,391,444 A    7/1983   Bromley
5,967,898 A   10/1999   Takasaka et al.
(Continued)

OTHER PUBLICATIONS

Chartier; "Preorders begin for iPhone, iPod touch game controller." Published Feb. 8, 2011; in Macworld website (online); http://www.macworld.com/article/1157741/icontrolpad.html; entire document especially p. 1.

(Continued)

*Primary Examiner* — Jason Yen
(74) *Attorney, Agent, or Firm* — Hall Estill Attorneys at Law

(57) ABSTRACT

A device directed to a combination computing and input device. The computing device providing a plurality of sides, each of the plurality of sides are disposed between an electronic display screen and a back of the computing device. The input device communicates with the computing device and provides a pair of control modules adjacent to and confining the computing device on at least two opposing sides of the computing device. The input device further provides a structural bridge securing the pair of control modules one to the other, and a touch sensitive input module. The structural bridge adaptively and snugly accommodate the length of the computing device. A first of the pair of control modules features a retention mechanism communicating with the structural bridge. The retention mechanism adaptively secures the structural bridge such that the pair of control modules snugly accommodate the length of the computing device.

22 Claims, 40 Drawing Sheets

Related U.S. Application Data continuation-in-part of application No. 14/840,184, filed on Aug. 31, 2015, now Pat. No. 9,592,453, which is a continuation-in-part of application No. 14/611,804, filed on Feb. 2, 2015, now Pat. No. 9,126,119, which is a continuation-in-part of application No. 13/681,153, filed on Nov. 19, 2012, now Pat. No. 8,944,912, which is a continuation-in-part of application No. 13/494,801, filed on Jun. 12, 2012, now Pat. No. 9,005,026.

(60) Provisional application No. 61/577,709, filed on Dec. 20, 2011.

(51) Int. Cl.

| | | |
|---|---|---|
| G06F 13/10 | (2006.01) | |
| G06F 3/02 | (2006.01) | |
| A63F 13/23 | (2014.01) | |
| A63F 13/92 | (2014.01) | |
| A63F 13/31 | (2014.01) | |
| A63F 13/2145 | (2014.01) | |
| A63F 13/98 | (2014.01) | |
| A63F 13/235 | (2014.01) | |
| G06F 1/16 | (2006.01) | |
| G06F 13/40 | (2006.01) | |
| A63F 13/50 | (2014.01) | |
| A63F 13/20 | (2014.01) | |

(52) U.S. Cl.
CPC .......... *A63F 13/2145* (2014.09); *A63F 13/23* (2014.09); *A63F 13/235* (2014.09); *A63F 13/31* (2014.09); *A63F 13/50* (2014.09); *A63F 13/92* (2014.09); *A63F 13/98* (2014.09); *G06F 1/1632* (2013.01); *G06F 1/1692* (2013.01); *G06F 3/0219* (2013.01); *G06F 13/102* (2013.01); *G06F 13/409* (2013.01); *G06F 13/4022* (2013.01); *G06F 13/4068* (2013.01); *A63F 2009/2457* (2013.01); *A63F 2300/1043* (2013.01); *A63F 2300/204* (2013.01)

(56) References Cited

U.S. PATENT DOCUMENTS

| | | | |
|---|---|---|---|
| 5,976,018 | A | 11/1999 | Druckman |
| 6,290,565 | B1 | 9/2001 | Galyean, III et al. |
| 6,584,382 | B2 | 6/2003 | Karem |
| 6,710,764 | B1 | 3/2004 | Burgel et al. |
| 7,200,702 | B2 | 4/2007 | Keely et al. |
| 7,298,613 | B2 | 11/2007 | Yin et al. |
| 7,653,771 | B2 | 1/2010 | Liberty |
| 7,733,637 | B1 | 6/2010 | Lam |
| 7,746,629 | B2 | 6/2010 | Assouad et al. |
| 7,758,424 | B2 | 7/2010 | Riggs et al. |
| 7,774,155 | B2 | 8/2010 | Sato et al. |
| 7,818,668 | B2 | 10/2010 | Michelstein et al. |
| 7,933,118 | B2 | 4/2011 | Chiu et al. |
| 7,942,745 | B2 | 5/2011 | Ikeda et al. |
| 8,018,098 | B2 | 9/2011 | Lu et al. |
| 8,100,769 | B2 | 1/2012 | Rabin |
| 8,100,770 | B2 | 1/2012 | Yamazaki et al. |
| 8,180,295 | B2 | 5/2012 | Mao |
| 8,188,977 | B2 | 5/2012 | Kuwaki et al. |
| 8,192,285 | B2 | 6/2012 | Cheng et al. |
| 2002/0155890 | A1* | 10/2002 | Ha ............ A63F 13/10 463/32 |
| 2003/0147008 | A1 | 8/2003 | Liu |
| 2003/0231189 | A1 | 12/2003 | Williams |
| 2004/0222970 | A1 | 11/2004 | Martinez et al. |
| 2005/0092590 | A1 | 5/2005 | Sakou |
| 2005/0227761 | A1 | 10/2005 | Yoshino et al. |
| 2005/0255915 | A1* | 11/2005 | Riggs ............ A63F 13/06 463/37 |
| 2005/0272471 | A1 | 12/2005 | Sherman |
| 2006/0291156 | A1 | 12/2006 | Allen |
| 2007/0054736 | A1 | 3/2007 | See |
| 2007/0268247 | A1 | 11/2007 | Quatro |
| 2009/0209288 | A1 | 8/2009 | Rofougaran |
| 2009/0280863 | A1 | 11/2009 | Shin et al. |
| 2009/0291760 | A1 | 11/2009 | Hepburn et al. |
| 2010/0069160 | A1 | 3/2010 | Barrett et al. |
| 2010/0081505 | A1* | 4/2010 | Alten ............ G06F 1/1632 463/36 |
| 2010/0250815 | A1 | 9/2010 | Street et al. |
| 2011/0076003 | A1 | 3/2011 | Cho et al. |
| 2011/0118022 | A1 | 5/2011 | Aronzon et al. |
| 2011/0143835 | A1 | 6/2011 | Sizelove |
| 2011/0230178 | A1 | 9/2011 | Jones et al. |
| 2011/0249394 | A1 | 10/2011 | Nielsen et al. |
| 2011/0260969 | A1 | 10/2011 | Workman |
| 2012/0108335 | A1 | 5/2012 | Liotta et al. |
| 2012/0169597 | A1 | 7/2012 | Liotta |
| 2012/0236485 | A1 | 9/2012 | Staats et al. |
| 2012/0315989 | A1 | 12/2012 | Young et al. |
| 2013/0120258 | A1 | 5/2013 | Maus |
| 2013/0178285 | A1 | 7/2013 | Joynes et al. |
| 2014/0274394 | A1* | 9/2014 | Willis ............ G06F 1/1632 463/37 |
| 2015/0205328 | A1* | 7/2015 | Lin ............ G06F 1/1632 361/679.44 |

OTHER PUBLICATIONS

Wattanajantra; "iControlPad unofficial iPhone gamepad coming soon." in c/net UK website (online); Published Aug. 27, 2010; http://crave.cnet.co.uk/mobiles/icontrolpad-unofficial-iphone-gannepad-coming-soon-50000514; entire document, especially pp. 3, 4.
Atari Arcade; Website Printout; http://atari.com/buy-games/arcade/atari-arcade-ipad; Nov. 30, 2011; pp. 1-3.
Ion iCade Arcade Cabinet; Website Printout; http://www.ionaudio.com/products/details/icade; 2012; pp. 1-6.
This application relies, under 35 U.S.C. § 120, on the earlier filing date of prior U.S. Appl. No. 15/457,571, filed Mar. 13, 2017.
U.S. Appl. No. 15/457,571, filed Mar. 13, 2017 relies, under 35 U.S.C. § 120, on the earlier filing date of prior U.S. Appl. No. 14/840,184, filed Aug. 31, 2015.
U.S. Appl. No. 14/840,184, filed Aug. 31, 2015 relies, under 35 U.S.C. § 120, on the earlier filing date of prior U.S. Appl. No. 14/611,804, filed Feb. 2, 2015.
U.S. Appl. No. 14/611,804, filed Feb. 2, 2015 relies, under 35 U.S.C. § 120, on the earlier filing date of prior U.S. Appl. No. 13/681,153, filed Nov. 19, 2012.
U.S. Appl. No. 13/681,153, filed Nov. 19, 2012 relies, under 35 U.S.C. § 120, on the earlier filing date of prior U.S. Appl. No. 13/494,801, filed Jun. 12, 2012.
U.S. Appl. No. 13/494,801, filed Jun. 12, 2012 relies, under 35 U.S.C. § 119, on the earlier filing date of prior U.S. Appl. No. 61/577,709, filed Dec. 20, 2011.

* cited by examiner

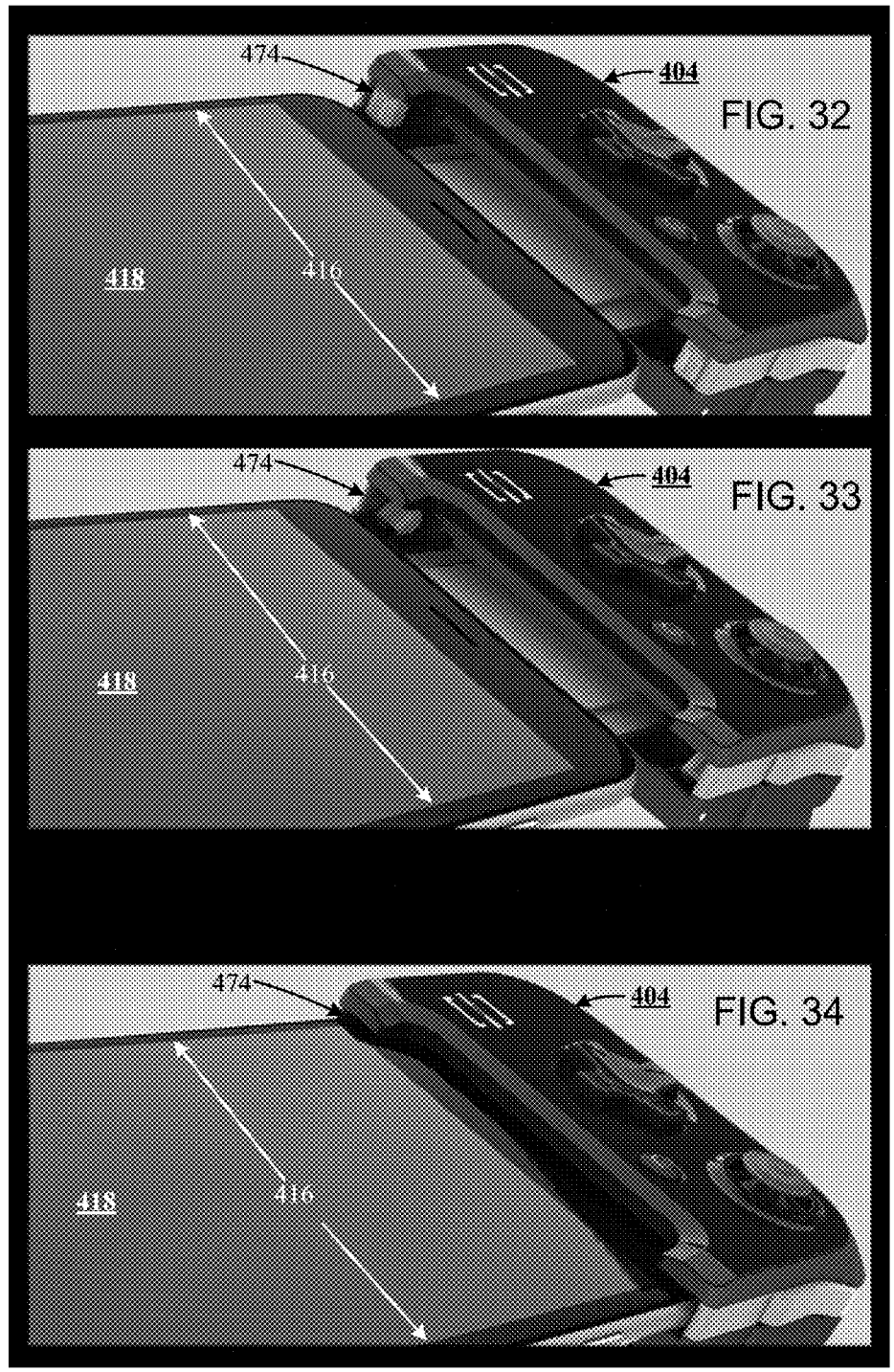

GAME CONTROLLER WITH STRUCTURAL BRIDGE

RELATED APPLICATIONS

This application is a continuation of U.S. patent application Ser. No. 15/457,571 filed Mar. 13, 2017, which is a continuation-in-part of U.S. patent application Ser. No. 14/840,184 filed Aug. 31, 2015, which is a continuation-in-part of U.S. patent application Ser. No. 14/611,804 filed on Feb. 2, 2015, now U.S. Pat. No. 9,126,119 issued on Sep. 8, 2015, which is a continuation-in-part of U.S. patent application Ser. No. 13/681,153 filed on Nov. 19, 2012, now U.S. Pat. No. 8,944,912 issued on Feb. 3, 2015, which is a continuation-in-part of U.S. patent application Ser. No. 13/494,801 filed on Jun. 12, 2012, now U.S. Pat. No. 9,005,026 issued on Apr. 14, 2015, which in turn claims priority to U.S. Provisional Patent application Ser. No. 61/577,709 filed on Dec. 20, 2011.

SUMMARY OF THE INVENTION

In a preferred embodiment, a combination includes at least, but is not limited to, a computing device, the computing device providing a plurality of sides, each of the plurality of sides are disposed between an electronic display screen of the computing device and a back of the computing device, an input device interacting with the computing device, and a communication link. The input device communicates with the computing device and providing a pair of control modules adjacent to and confining the computing device on at least two opposing sides of the computing device. The communication link facilitating communication between the pair of control modules and the computing device. The input device further provides a structural bridge securing the pair of control modules one to the other, and a touch sensitive input module. The touch sensitive module is preferably a touch screen, which relays instructions to the computing device to alter an image displayed on the electronic display. The structural bridge adaptively and snugly accommodates the length of the computing device by way of a retention mechanism of a first of the pair of control modules. The retention mechanism adaptively secures the structural bridge such that the pair of control modules snugly accommodates the length of the computing device.

BRIEF DESCRIPTION OF THE DRAWINGS

FIG. 32 shows a front perspective view of the second control module of the electronic game control apparatus of FIG. 26, with a computing devices of maximum size staged to engage the first control module.

FIG. 33 shows a front perspective view of the second control module of the electronic game control apparatus of FIG. 26, with the computing devices of maximum size commencing engagement with the first control module.

FIG. 34 shows a front perspective view of the second control module of the electronic game control apparatus of FIG. 26, with the computing devices of maximum size fully engaged with the first control module.

DETAILED DESCRIPTION

The present disclosure generally relates to a combination game controller and information input device directed to controlling electronic games and entry of information to a computing device, also referred to herein as video games, computer and applications games. The apparatus preferably includes a computing device, an electronic game communicating with the computing device, and an input device for controlling movement of a virtual object provided by the electronic game, and entry of information into the computing device. In a preferred embodiment, the input device includes a pair of opposing side structures adjacent opposing sides of plurality of sides of the computing device. The input device further preferably includes a plurality of input switches, wherein said input switches are adjacent each of the at least two opposing sides of the plurality of sides of the computing device, and a bridge structure disposed between the pair of sides to form a three sided structure. The third structure mitigates inadvertent removal of the computing device from the three sided structure when the computing device is fully nested within the three sided structure.

Figure 1:
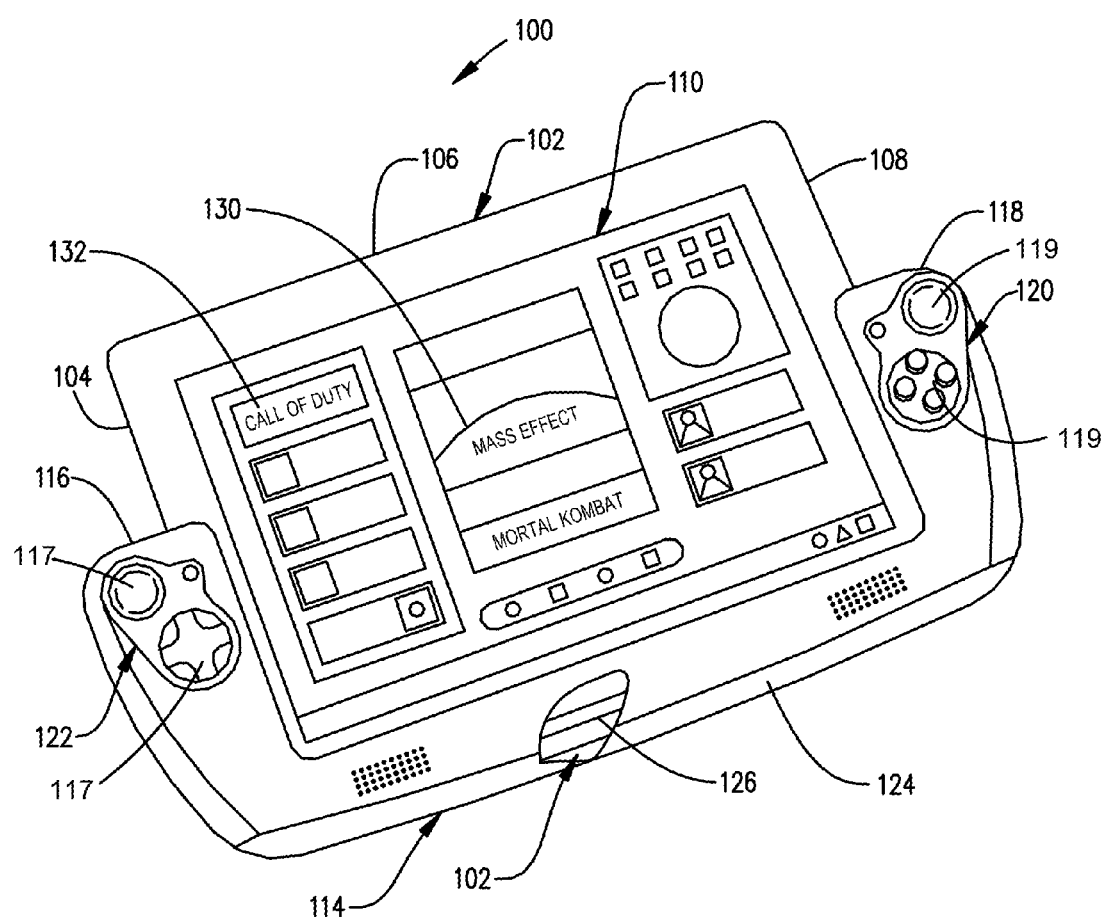
FIG. 1 is a front perspective view, with partial cutaway, of an embodiment an electronic game control apparatus constructed and operated in accordance with various embodiments disclosed.

Turning to the drawings, FIG. 1 provides an exemplary game controller and information entry device ("G&D") 100 capable of being used in accordance with various embodiments of the present invention. The exemplary G&D 100 has at least a computing device 102 (also referred to herein as a computing device 102), which provides a plurality of sides, such as 104, 106, 108, and 126. Each of the plurality of sides 104, 106, and 108 are disposed between an electronic display screen 110, of the computing device 102, and a back 112 (shown by FIG. 2) of the computing device 102 operates. The G&D 100 further preferably includes an input device 114. The computing device 102 may take the form of a tablet computer, smart phone, notebook computer, or other portable computing device, In a preferred embodiment, the input device 114 provides a pair of side structures, 116 and 118, with a bridge structure 115 disposed there between. One of the pair of side structures, for example 116, is adjacent to and confines the computing device 102 on a first side, such as 104 of the plurality of sides 104, 106, 108, and 126 of the computing device 102. The second side structure of the pair of side structures, such as 118, is adjacent to and confines the computing device 102 on a second side, such as 108, of the plurality of sides 104, 106, 108, and 126 of the computing device 102, wherein the first and second sides, such as 104 and 108, of the plurality of sides 104, 106, 108, and 126 of the computing device 102 are opposing sides of the plurality of sides 104, 106, 108, and 126, of the computing device 102.

In a preferred embodiment, the input device 114 further provides a plurality of removable game control modules 120 and 122, wherein the removable game control modules 120 and 122 are adjacent each of the at least two opposing sides 104 and 108, of the plurality of sides 104, 106, 108, and 126, of the computing device 102, and a bridge structure 124, disposed between the pair of side structures 116 and 118, and adjacent the third side 126, of the plurality of sides 104, 106, 108, and 126, of the computing device 102.

Figure 8:
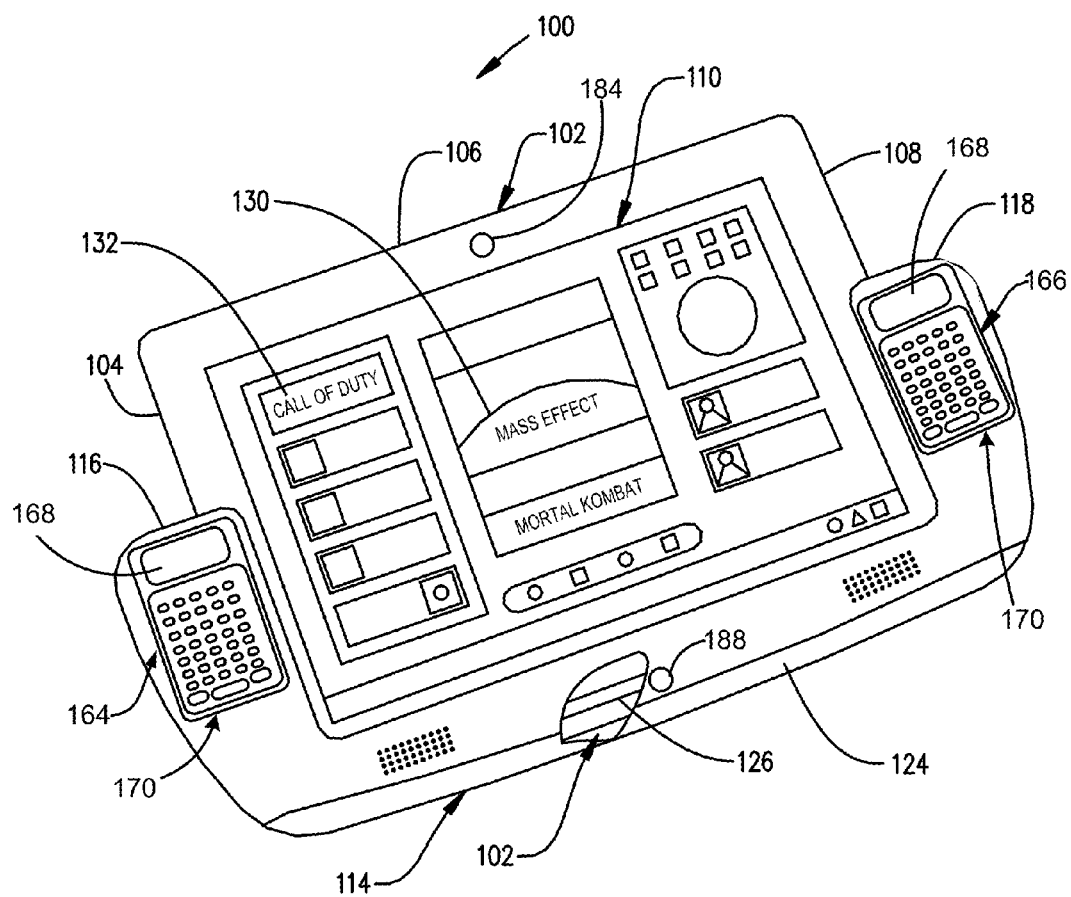
FIG. 8 displays a front perspective view, with partial cutaway, of a combination electronic game control and information input device constructed and operated in accordance with various embodiments disclosed and claimed herein.

In a preferred embodiment, the removable game control modules 120 and 122 may be removed from the input device 114, and replaced by removable keyboard modules 164 and 166, of FIG. 8. To facilitate the exchange of modules, the input device preferably provides a pair of input module apertures 170. The removable keyboard modules collectively form a full function keyboard and each provide an auxiliary electronic display screen ("ADS") 168, each ADS 168 having at least the functionality of the electronic display screen 110.

Figure 10:
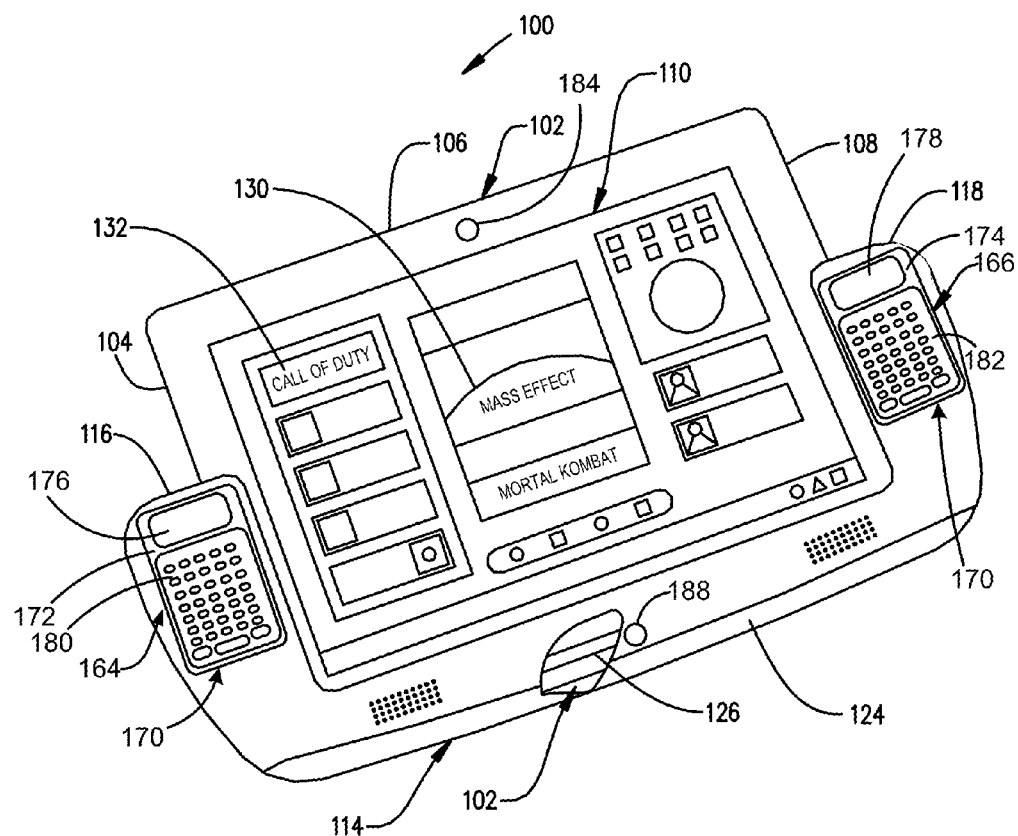
FIG. 10 illustrates a front perspective view, with partial cutaway, of an alternate embodiment of a combination electronic game control and information input device constructed and operated in accordance with various embodiments disclosed and claimed herein.

In an alternate embodiment, shown by FIG. 10, the removable keyboard modules 164 and 166 are a pair of touch responsive electronic display screens 172 and 174, each of the touch responsive electronic display screens having at least the functionality of the electronic display screen 110, include the functionality of a mouse pad portions 176 and 178, and selectively presents keys of a keyboard 180 and 182 for information entry. Preferably, the keys are virtual keys that respond to a touch by a user.

Returning to FIG. 1, preferably, the bridge structure 124 in combination with the pair of side structures 116 and 118 form a three sided structure 128 (of FIG. 5) (also referred to herein as a u-shaped structure 128 of the input device 114), in which the computing device 102 nests, such that the computing device 102 is confined by the u-shaped structure 128, and the u-shaped structure 128 mitigates inadvertent removal of the computing device 102 from the u-shaped structure 128 when the computing device 102 is fully nested within the three sided structure 128.

The G&D 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of a character. It is noted that FIG. 1 displays the housings of the plurality of switches, whereas at least some of the plurality of switches are shown in the partial cutaway of FIG. 3.

Figure 2:
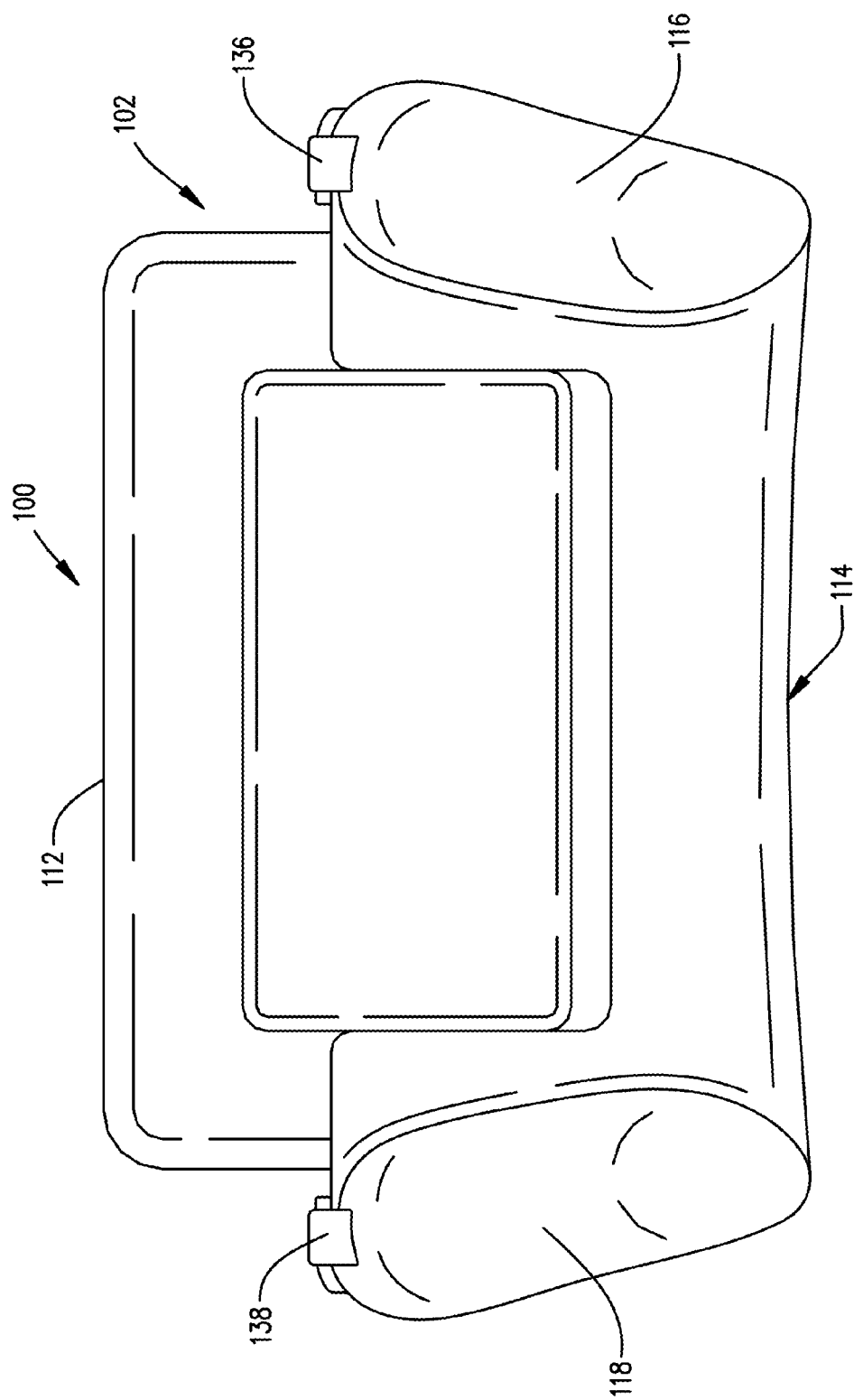
FIG. 2 shows a back plan view of the apparatus of FIG. 1.

FIG. 2 depicts and reveals the back 112 of the computing device 102. Further shown by FIG. 2, is the input device 114, which provides a pair of trigger switches 136 and 138, supported by their corresponding side structures 116 and 118 respectively.

Figure 3:
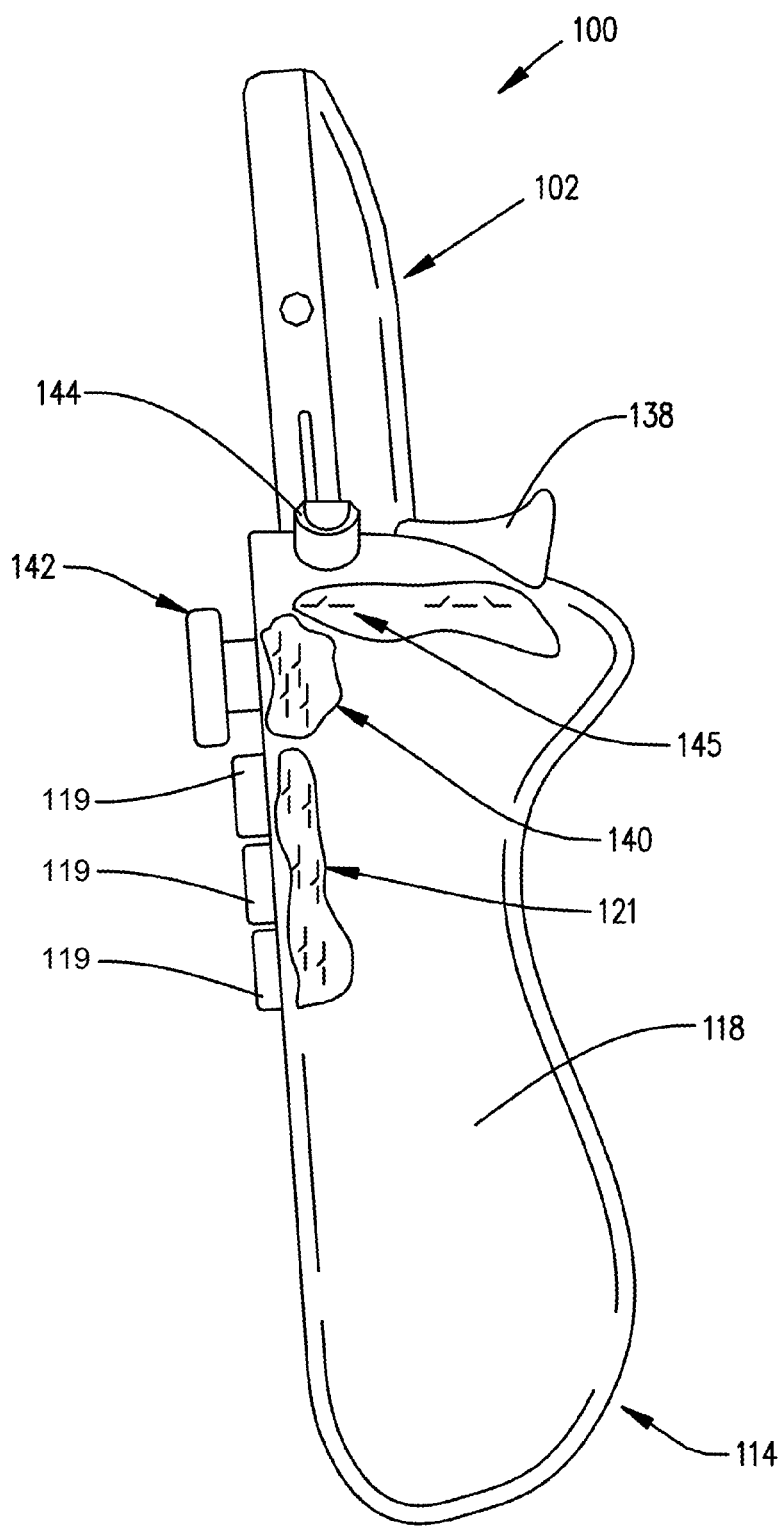
FIG. 3 displays a right side plan view, with partial cutaway, of the apparatus of FIG. 1, constructed in accordance with various embodiments disclosed and claimed herein.

FIG. 3 shows that a predetermined number of the plurality of switches 140, collaborate with each other to form an input apparatus 142, the input apparatus 142 controls display of virtual objects displayed on the electronic display screen 110 of the computing device 102. Preferably, the input apparatus 142 is a joystick 142. FIG. 3 further shows that the input device 114 provides a plurality of buttons 144 and 119 of the removable game control modules 120, which activate corresponding switches 145 and 121. The main function of the trigger 138, the joystick 142, and the buttons 144 and 119 of the removable game control modules 120 is to govern the movement/actions of a playable body/object or otherwise influence events in a video game 130 (of FIG. 1) or an alternate computer game.

Figure 4:
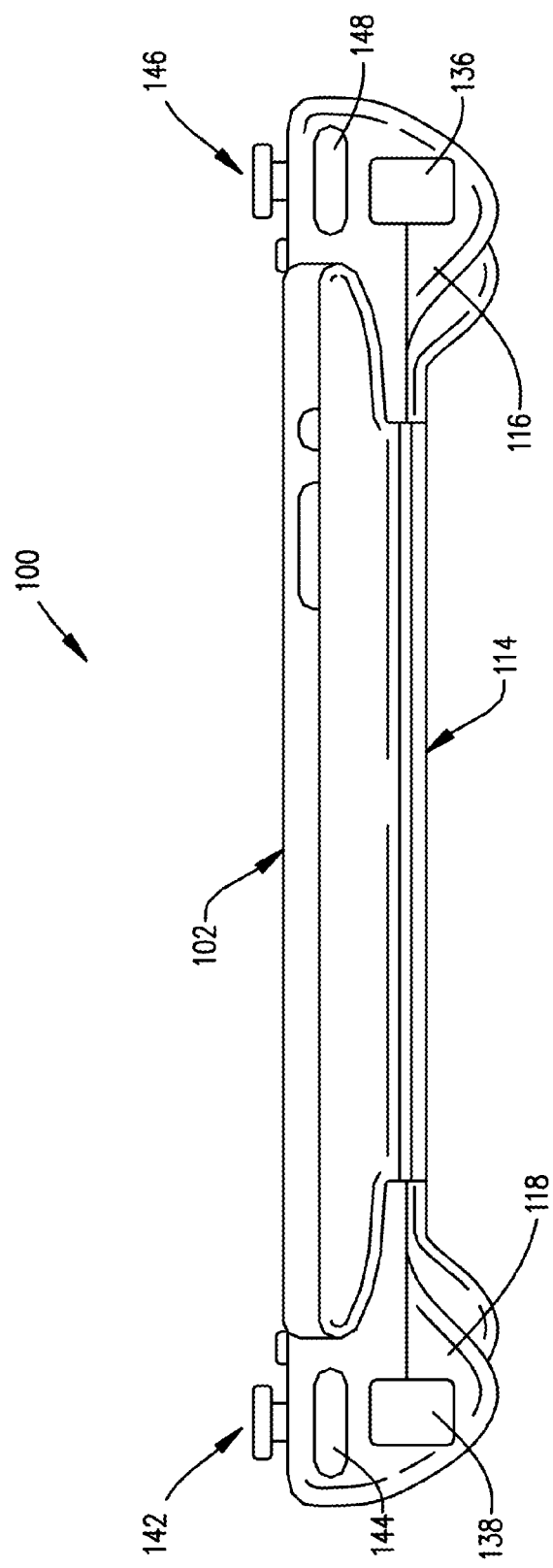
FIG. 4 depicts a right side plan view of the apparatus of FIG. 1, constructed in accordance with various embodiments disclosed and claimed herein.
Figure 5:
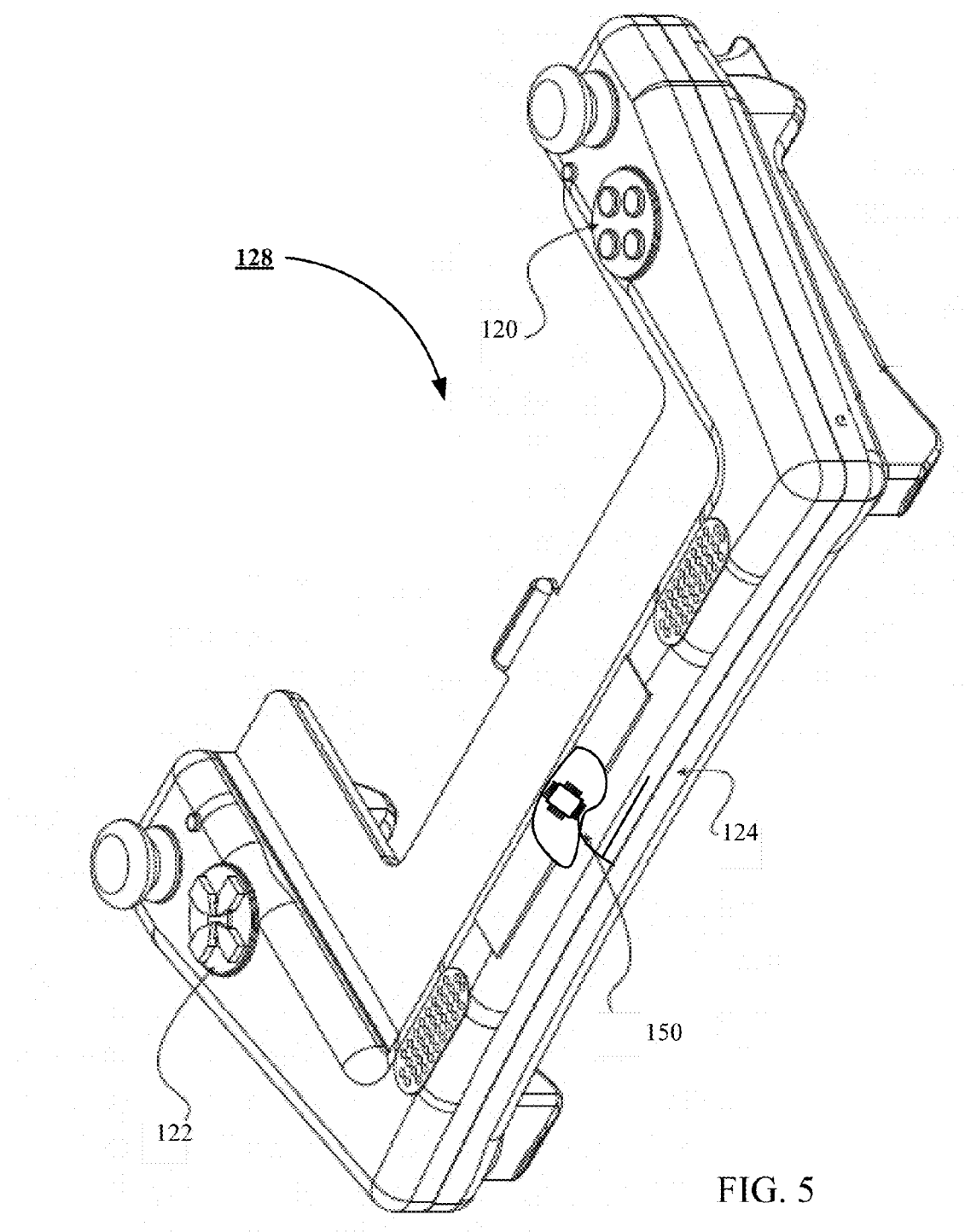
FIG. 5 illustrates a top perspective view of an embodiment of an input device of FIG. 1, constructed in accordance with various embodiments disclosed and claimed herein.

FIG. 4 shows the G&D 100, further includes a second joystick 146, and a second button 148, which are provided on the side structure 116, adjacent the trigger 136. While FIG. 5 shows the central processing unit (CPU) 150, of the input device 114.

Figure 6:
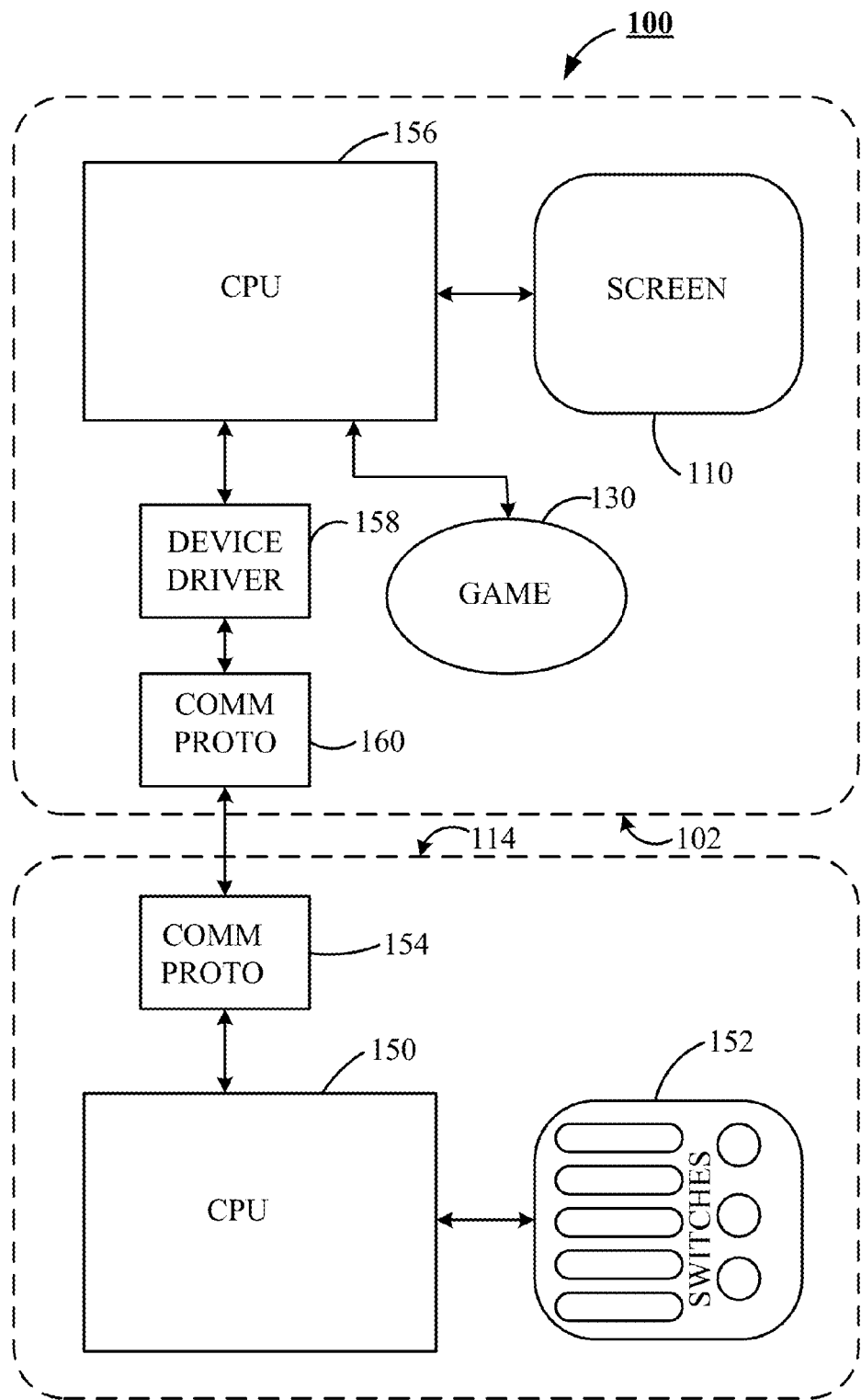
FIG. 6 is a block diagram of an embodiment of the apparatus of FIG. 1.

FIG. 6 shows the input device 114 includes the CPU 150, interacting with the plurality of switches 152, which preferably include at least switches 119 of the removable game control modules 120 (of FIG. 1), switches 117 of the removable game control modules 122 (of FIG. 1), 136, 138, 142, 144, 146, and 148 (of FIGS. 2 and 3). FIG. 6 further shows the input device 114 includes a communications protocol 154 providing the communication link between the computing device 102, and the input device 114. In a preferred embodiment, a Universal Serial Bus (USB) communications protocol is utilized. However, as those skilled in the art will recognize, the communications protocol 154 is not limited to a USB protocol.

FIG. 6 further shows that the computing device 102 preferably includes at least a CPU 156, interacting with the electronic display screen 110, the video game 130, a device driver 158, which facilitates the interaction between the computing device 102 and the input device 114, and a communications protocol 160 providing the communication link between the computing device 102, and the input device 114. In a preferred embodiment, a Universal Serial Bus (USB) communications protocol is utilized. However, as those skilled in the art will recognize, the communications protocol 160 is not limited to a USB protocol.

Figure 7:
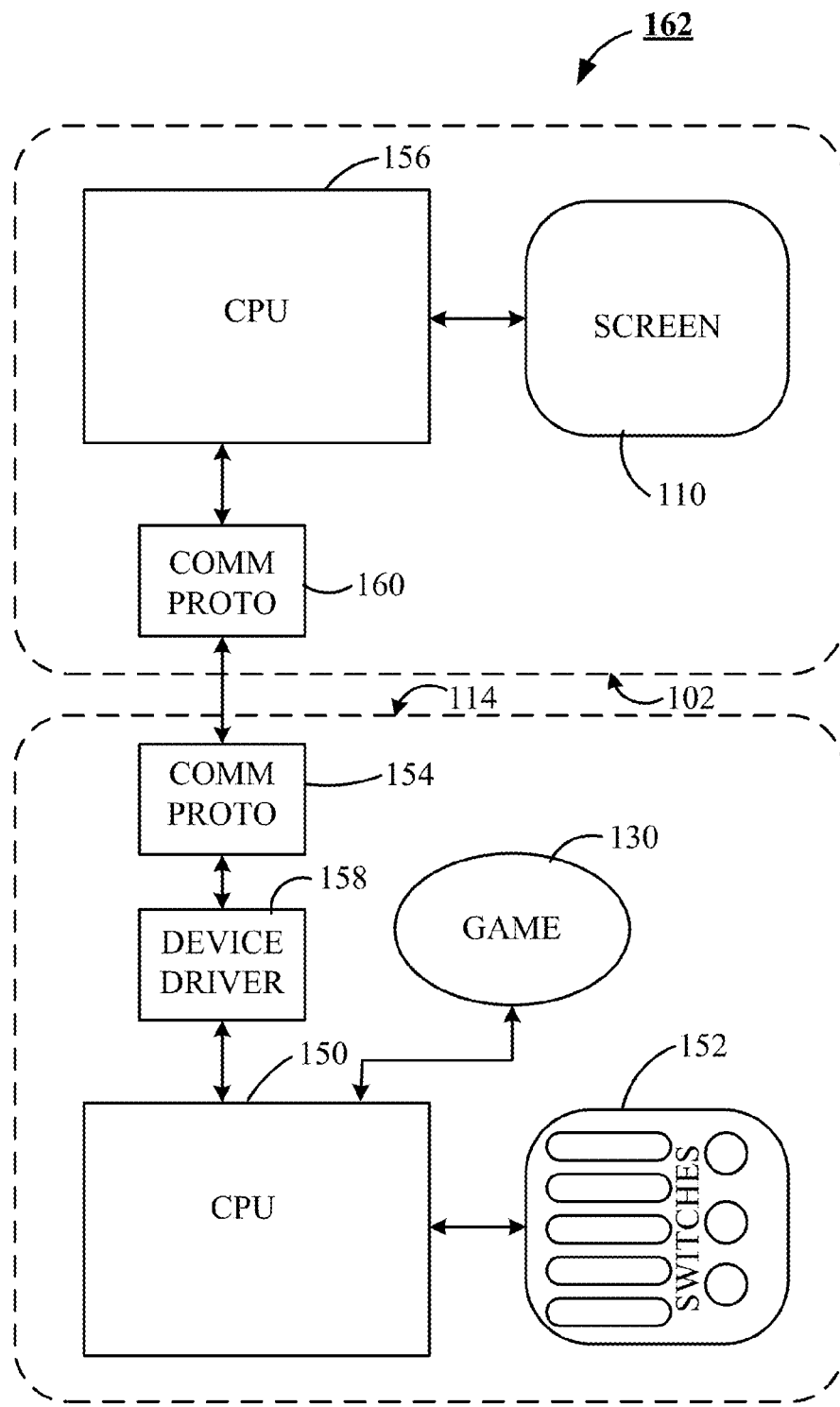
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

Figure 9:
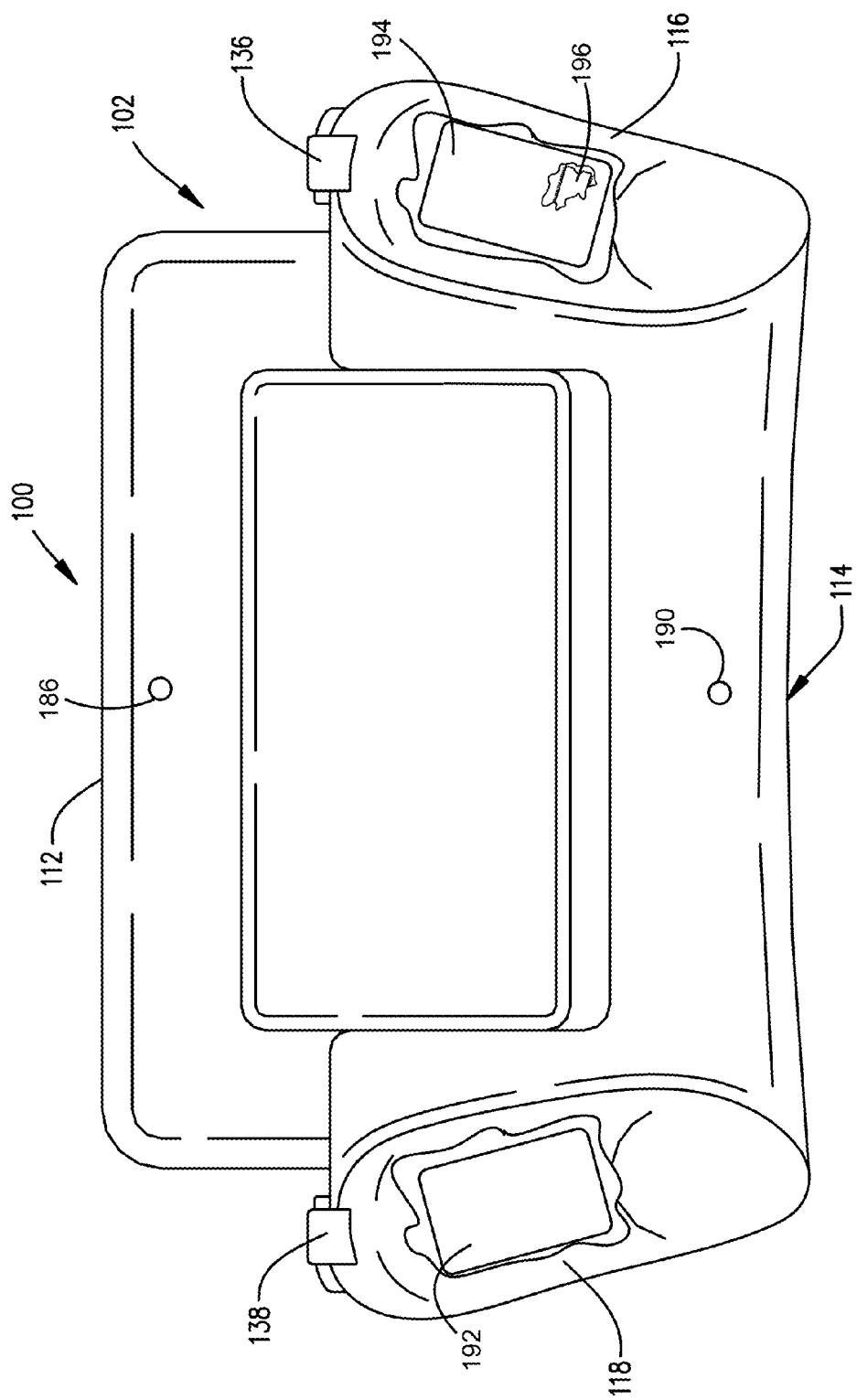
FIG. 9 depicts a back plan view of the combination of FIG. 8.

FIG. 8 shows in a preferred embodiment, the G&D 100 includes a first camera 184, on a first side of the computing device 102, a second camera 186, on the back side of the computing device 102 (shown by FIG. 9), a third camera 188 on a first side of the input device 114, and a fourth camera 190 on the back side of the input device 114 (shown by FIG. 9).

In a preferred embodiment, each of the four cameras may selectively function independently, or may be used in conjunction with one another, and each of the four cameras 184, 186, 188, and 190 are fully functional in capturing still and video images. Additionally, and preferably, the first and second cameras 184 and 186 are fully operative, even when the computing device 102 is detached from the input device 114, while the third and fourth cameras 188 and 190 are fully functional, even when the input device 114 is detached from the computing device 102.

In a preferred embodiment, when the computing device 102 is nested in the input device 114, the first and second cameras, 184 and 186, are responsive, either independently or simultaneously, to input from either the computing device 102, or the input device 114, depending on which device is selected for control of the first and second cameras, 184 and 186. Further, in the preferred embodiment, each the computing device 102 and the input device 114, are configured with a Bluetooth protocol stack communication feature, which permits the user to operate the first and second cameras, 184 and 186, of the computing device 102 with the input device 114, even when the computing device 102 is detached from the input device 114. Likewise, when the computing device 102 and the input device 114 are configured with a Bluetooth protocol stack communication feature, the user may operate the third and fourth cameras, 188 and 190, of the input device 114, using the computing device 102. In other words, in the preferred embodiment, each of the four cameras 184, 186, 188, and 190, may be selectively operated, individually or collectively, whether or not the computing device 102 is nested within the input device 114.

FIG. 9 shows that in a preferred embodiment, the input device 114 includes an auxiliary power source 192, and an auxiliary data storage device 194, which preferably includes a cache portion 196. Preferably, the auxiliary power source 192 is a lithium ion battery, which provides power to the input device 114, and the computing device 102, when the power source of the computing device 102 is depilated; and the auxiliary data storage device 194 is a solid state hard drive.

In the preferred embodiment, the cache 196 is sized to buffer synchronized input from each of the cameras 184, 186, 188, and 190, such that the auxiliary data storage device 194 may store and retrieve images, still or video, for display seamlessly, including a simultaneous output of video images recorded by each of the cameras 184, 186, 188, and 190.

In a non-limiting exemplary application of utilizing the cameras 184, 186, 188, and 190, the first camera 184 could be trained on an information presenter, while the second camera 186 is trained on a portion of an audience attending the presentation. The third camera 188 could be trained on a screen used by the presenter for presenting their information to the audience, while the fourth camera is trained on an alternate portion of the audience. By simultaneously replaying the recorded presentation, a response of the audience to the information, and sequence of information being presented, may be analyzed for fostering improvements to the presentation.

Figure 11:
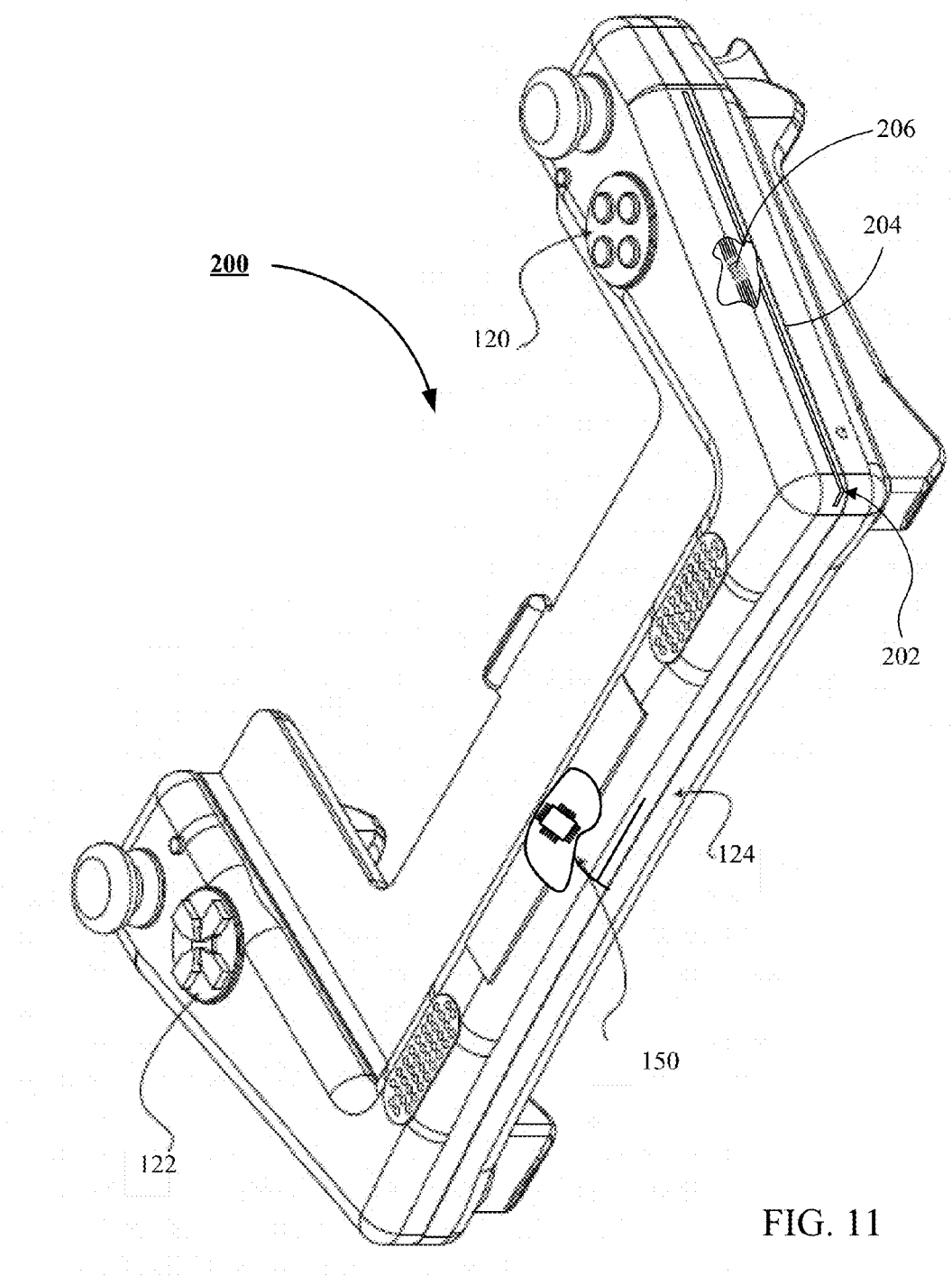
FIG. 11 shows a top perspective view of an embodiment of an input device with an integrated point of sale device, the input device is constructed in accordance with various embodiments disclosed and claimed herein.

FIG. 11 shows an alternative embodiment of a video game controller 200, which provides an integrated transaction card input feature 202. Preferably, the integrated transaction card input feature 202, includes a transaction card slot 204, and a transaction card reader 206. In a preferred embodiment, the transaction card reader 206 is a magnetic strip reader, but as those skilled in the art will recognize, the transaction card reader can be, in the alternate: is an optical character recognition reader; a barcode reader; an object recognition reader, or a pattern recognition reader.

Figure 12:
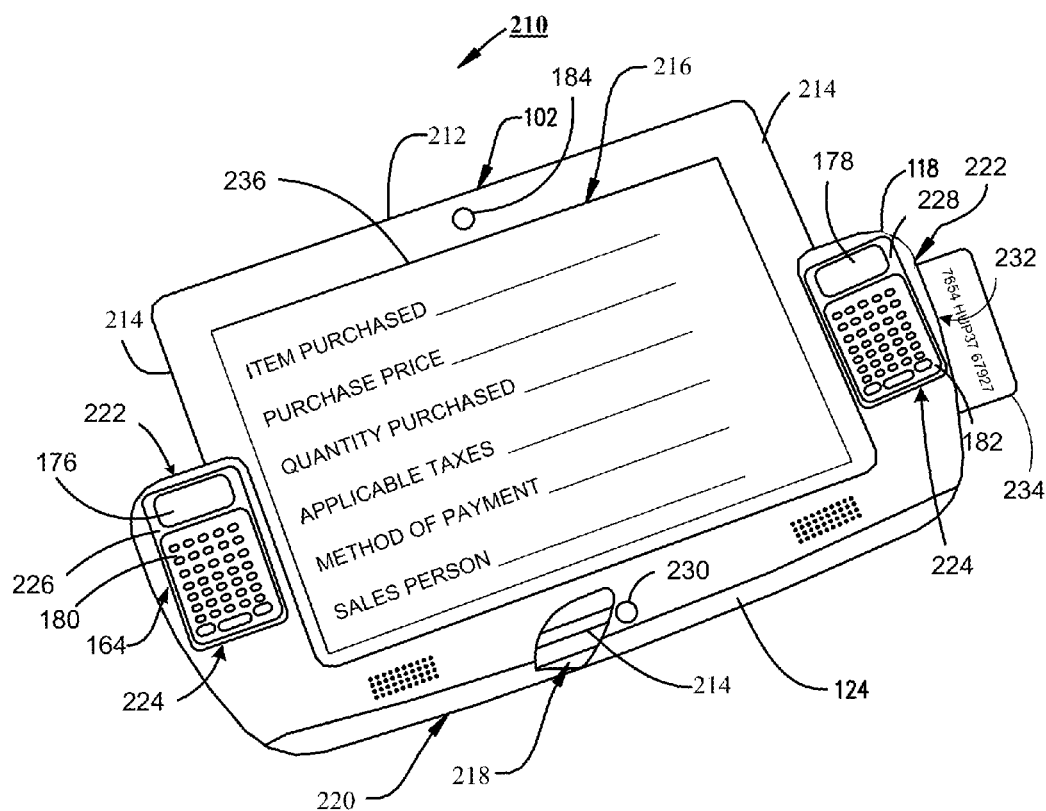
FIG. 12 displays a front perspective view, with partial cutaway, of an alternate embodiment of a combination electronic game control and information input device, the information input device provides the integrated point of sale device.

FIG. 12 shows that in a preferred embodiment, a combination computing device and electronic game controller with an integrated point of sale device 210 preferably includes a computing device 212, having a plurality of sides 214, each of the plurality of sides 214, are disposed between an electronic display screen 216, of the computing device and a back 218 of the computing device, and an input device 220, in electronic communication with the computing device 212. The input device 220 preferably provides side structures 222, adjacent to and confining the computing device on at least two opposing sides of the plurality of sides 214 of the computing device 212. The input device 220, further preferably provides input module apertures 224, each input module aperture 224, selectively accepts either a game control module, such as 102 and 122 of FIG. 1, or a removable keyboard module, such as 226 and 228. Preferably, the input module apertures 224 are adjacent each of the at least two opposing sides of the plurality of sides 214 of the computing device 212.

FIG. 12 further shows that in a preferred embodiment, the combination computing device and electronic game controller with an integrated point of sale device 210 preferably includes a camera 230, communicating with each the input device 220, and the computing device 212. The camera 230, selectively captures either still or video images, and that the input device 220, further provides an integrated transaction card input feature 232, which interacts with a transaction card 234, and that preferably, the input device is an electronic game controller 220. Preferably, the camera 230 is a first camera, having a lens facing the user while the user is facing the electronic display screen 216, and includes at least a second camera, such as 186 or 190 (of FIG. 9), having a lens facing in a direction opposite that of the first camera 184.

FIG. 12 additionally shows an application 236, displayed on the electronic display screen 216, of the computing device 212. Preferably, the application 236, displayed on the electronic display screen 216 of the computing device 212, is a point of sale transactional computer application, which interacts with the electronic game controller 220 and the computing device 212.

Figure 13:
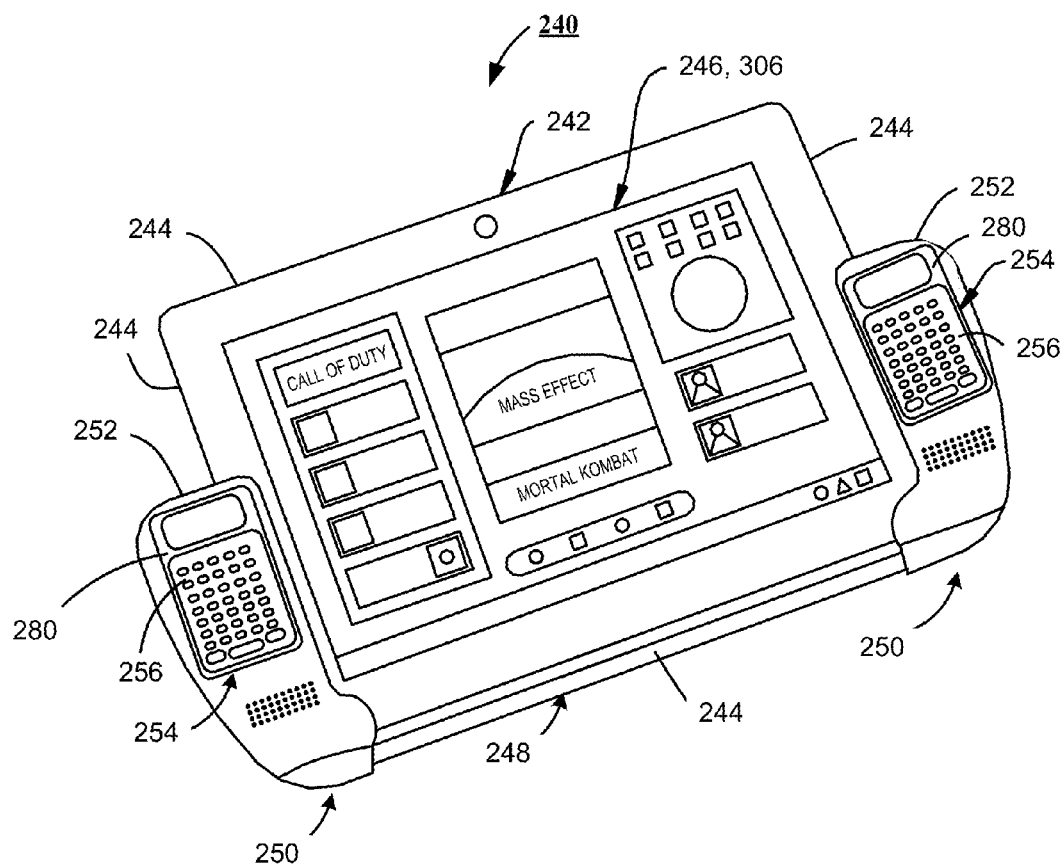
FIG. 13 displays a front perspective view, with partial cutaway, of an alternative embodiment of a combination computing device and electronic game control, the electronic game control includes a pair of control modules linked one to the other by a bridge member.

FIG. 13 shows an alternative embodiment of a combination computing device and electronic game control 240 (also referred to herein as a device 240). The computing device 242, preferably provides a plurality of sides 244, each of the plurality of sides are disposed between an electronic display screen 246, of the computing device 242, and a back 248 of the computing device 242.

Preferably, the electronic game controller 250 (also referred to herein as input device 250), is in electronic communication with the computing device 242. Preferably, the input device 250 provides a pair of control modules 252. The pair of control modules 252, are adjacent to and confining the computing device 242, on at least two opposing sides of the plurality of sides 244, of the computing device 242. The pair of control modules 252 preferably provide input module apertures 254, each input module aperture 254, secures an instructional input device 256. Preferably, the input module apertures 254 are adjacent each of the at least two opposing sides of the plurality of sides 244, of the computing device 242.

Figure 14:
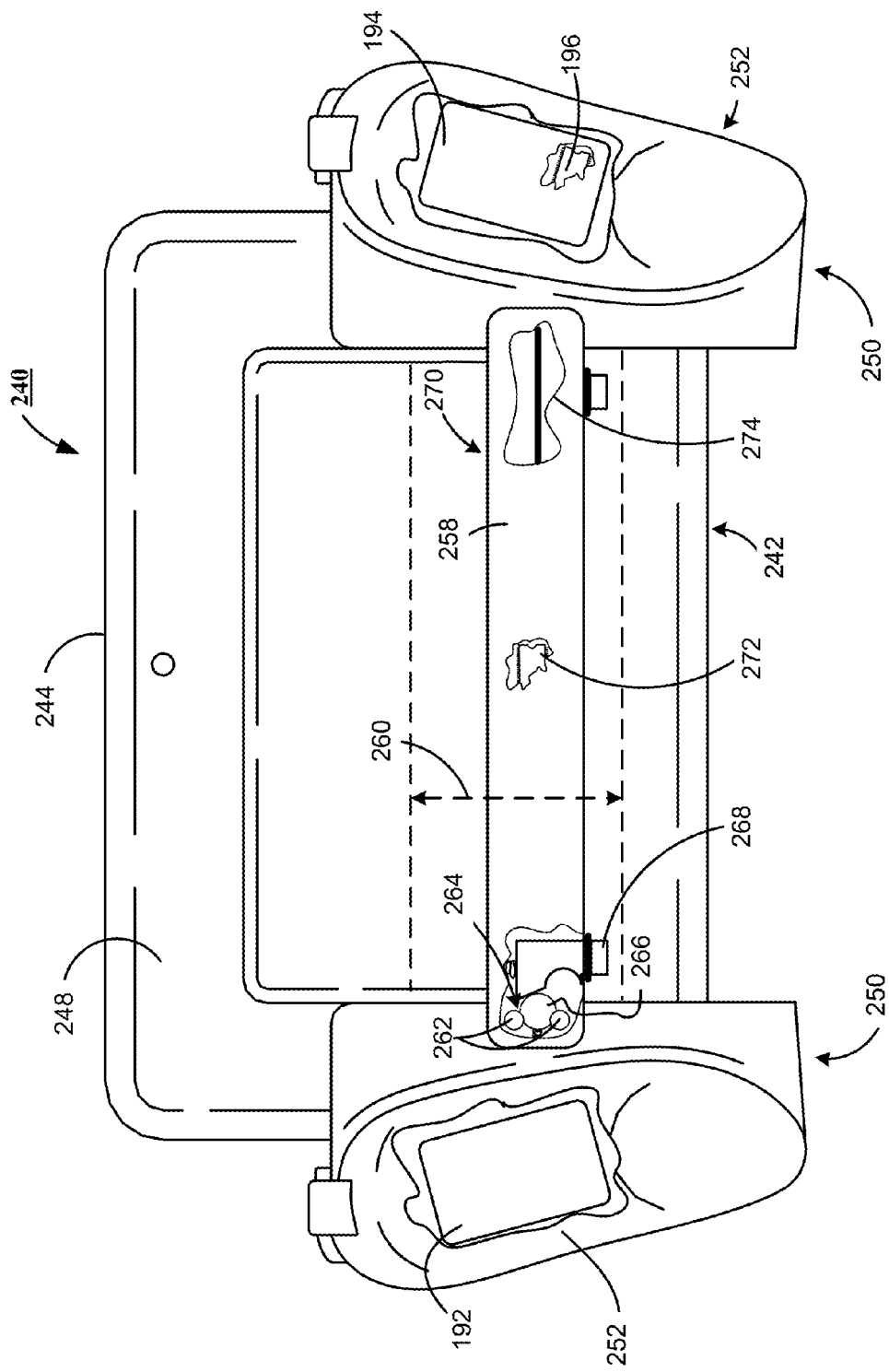
FIG. 14 shows a back plan view of the combination computing device and electronic game control of FIG. 13.

FIG. 14 shows the back 248, of the computing device 242, and the computing device 242, partially positioned within the input device 250. FIG. 14 further shows a structural bridge 258, securing the pair of control modules 252, one to the other, and communicating with the back 248, of the computing device 242, at a mid-region 260, of the back 248, of the computing device 242.

FIG. 14 further shows that the pair of control modules 252 provide a confinement boss 262, and the confinement boss 262 provides a fastening detent 264. The fastening detent 264 interacts with a retention member 266, to secure the structural bridge 258, to the pair of control modules 252. In a preferred embodiment, the retention member 266 is responsive to a catch 268, which preferably is a spring activated catch 268, and the retention member 268 is preferably a spring loaded retention member 268. Still further, FIG. 14 shows that in a preferred embodiment, the structural bridge 258 provides a communication link 270, which passing signals between the pair of control modules 252.

Continuing with FIG. 14, in a preferred embodiment, the communication link 270, provides a communication module 272, and in the alternative, provides a signal pathway 274, for use in passing signals between the pair of control modules 252. In a preferred embodiment, the communication module 272 is a wireless communication module 272, which operates in a frequency range of 2.4 GHz. In an alternate preferred embodiment, the wireless communication module 272 is a personal area network. As those skilled in the art, a personal area network (PAN) is a computer network used for communication among computerized devices, including telephones and personal digital assistants. PANs can be used for communication among the personal devices themselves (intrapersonal communication), or for connecting to a higher level network and the Internet (an uplink). A wireless personal area network (WPAN) is a PAN carried over wireless network technologies such as IrDA, Bluetooth, Wireless USB, Z-Wave, ZigBee, or even Body Area Network. The reach of a WPAN varies from a few centimeters to a few meters. A PAN may also be carried over wired computer buses such as USB and FireWire.

In an embodiment that utilizes the signal pathway 274, as the communication link, the signal pathway 274 may be in the form of a metallic conductor, a fiber optic conductor, a conductive polymer, or the conductive layer of a flex circuit. The skilled artisan will further appreciate that the structural bridge 258 (of FIG. 14), or 276 (of FIG. 15) may be either formed from a rigid material, such as a rigid polymer, or from a flexible material, such as a flexible polymer. In a preferred embodiment, when a flexible material is selected, and the signal pathway 274 is a wired pathway, the signal pathway 274 may be coupled externally to the structural bridge 276, as shown by FIG. 15.

Figure 15:
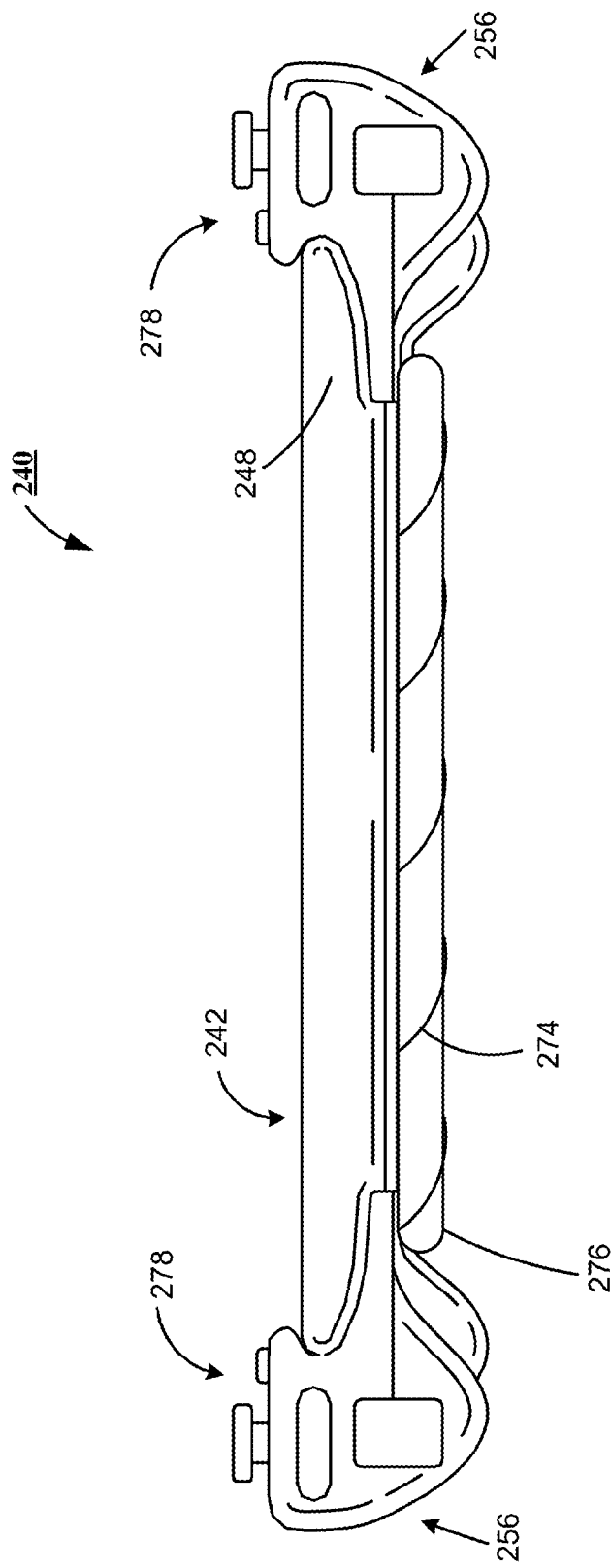
FIG. 15 illustrates a top perspective view of the alternative embodiment of the combination computing device and electronic game control of FIG. 13.

FIG. 15 further shows that in a preferred embodiment, the instructional input device 256, may be an electronic game control module 278 (which may be either removable, or fixed), or a keyboard module 280 (of FIG. 13, which may be either removable, or fixed).

Figure 16:
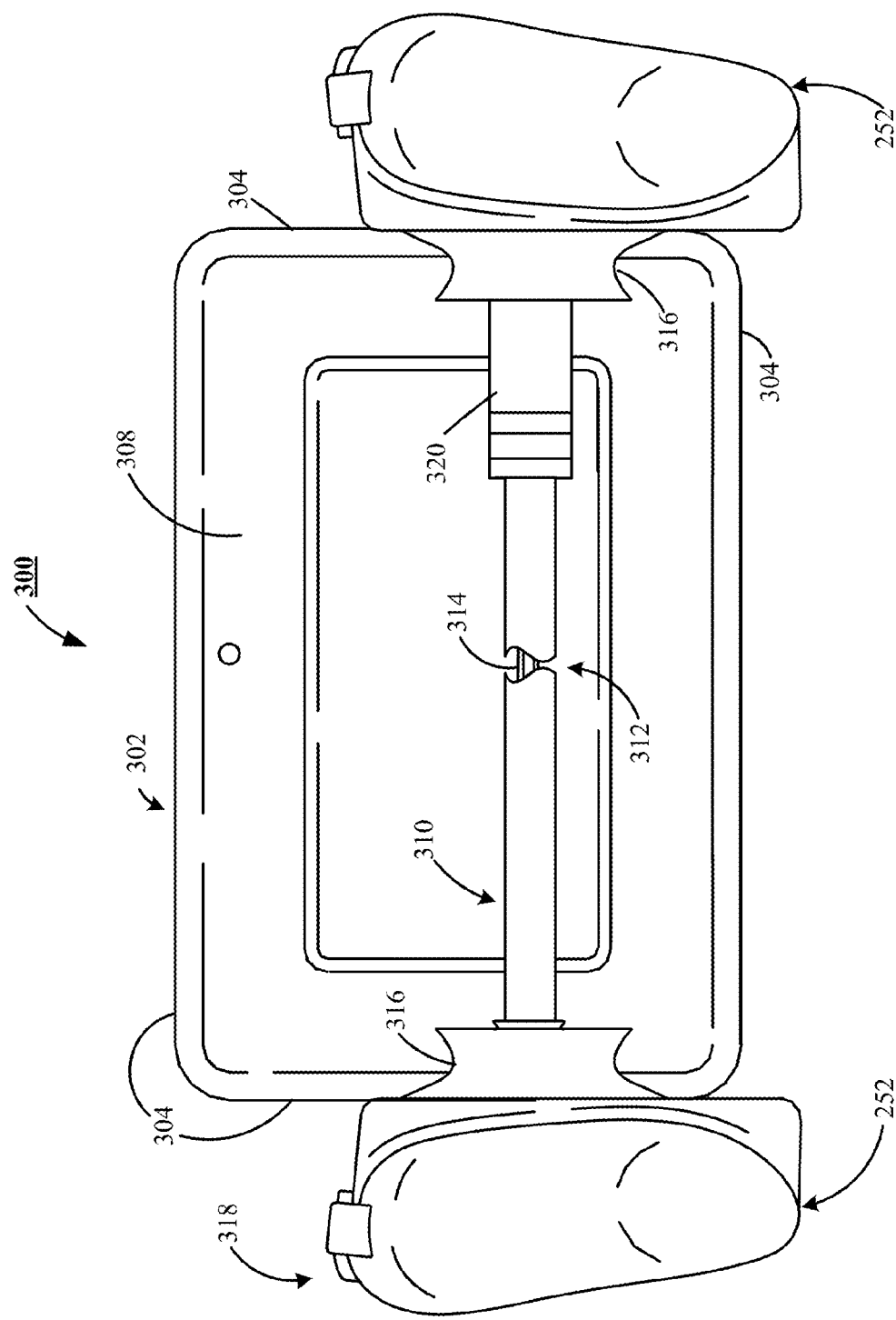
FIG. 16 shows a back plan view of an alternative combination computing device with a communication port secured thereon, and an input device attached to the communication port.

FIG. 16 shows a back plan view of an alternative combination 300, which preferably includes, but is not limited to, a computing device 302 that provides a plurality of sides 304, each of the plurality of sides are disposed between an electronic display screen 306 (of FIG. 13) of the computing device and a back 308 of the computing device 302. Preferably, the alternative combination 300 further includes a communication port 310, interacting with the computing device 302. In a preferred embodiment, the communication port 310 provides a communication link 312 (which for purposes of illustration is shown as a wired connection 314, but will be understood to be a wireless connection in an alternative embodiment). Preferably, the communication port 310 further provides a pair of confinement structures 316, the pair of confinement structures 316, which are preferably adjacent to and confining the computing device 302 on at least two opposing sides of the plurality of sides 304 of the computing device 302.

The alternative combination 300, further preferably includes an input device 318 (also referred to herein as input device 114), attached to and in electronic communication with the communication port 310. The input device 318 providing a pair of control modules 252, the pair of control modules 252 providing input module apertures 224 (of FIG. 12), each input module aperture 224 secures an instructional input device 356 (of FIG. 23), or such as 120 of FIG. 11, or 256 of FIG. 13. Preferably, the input module apertures 224, are adjacent each of the at least two opposing sides of the plurality of sides 304, of the computing device 302, and wherein the input device 356, or such as 120 of FIG. 11, or 256 of FIG. 13, is a separate and distinct structure from the communication port 310, forming no structural portion of the communication port 310.

FIG. 16 further shows that in a preferred embodiment, the communication port 310 further includes a fastening mechanism 320. In one embodiment, a soft draw latch, such as that provided by Southco, of 210 N. Brinton Lake Road Concordville, Pa. 19331, have been shown to be a useful fastening mechanism 320.

Figure 17:
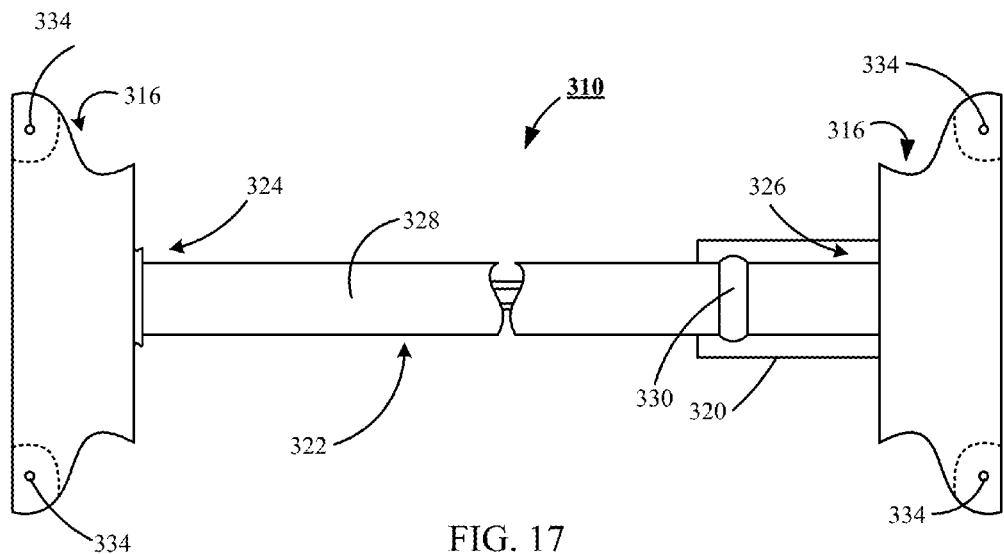
FIG. 17 shows a top plan view of the communication port of FIG. 16.

FIG. 17 shows a top view of the communication port 310 that preferably includes a structural bridge 322, securing the pair of confinement structures 316, one to the other. The structural bridge 322 is preferably secured to a select confinement structure of the pair of confinement structures 316 by way of a solid connection 324, and to remaining confinement structure of the pair of confinement structures 316 by way of a slip fit 326. The fastening mechanism 320, is preferably securely fastened to to a conduit 328, of the structural bridge 322, by way of a anchor member 330, the anchor member 330 is preferably positioned in a location adjacent the slip fit 326, and by way of an attachment member 332 (shown in FIG. 18), securely attached to the remaining confinement structure of the pair of confinement structures 316. The attachment member 332 is preferably positioned in a location adjacent the slip fit 326. Operation of the fastening mechanism 320 facilitates an expand and contract of the distance between the pair of confinement structures 316. The expansion and contraction of the distance between the pair of confinement structures 316, facilitates placement of the computing device 302 between the pair of confinement structures 316, the application of sufficient compressive load being placed on the computing device 302 to securely hold the computing device between the pair of confinement structures 316, and an ability to remove the compressive load and allow removal of the computing device from the communication port 310.

Figure 18:
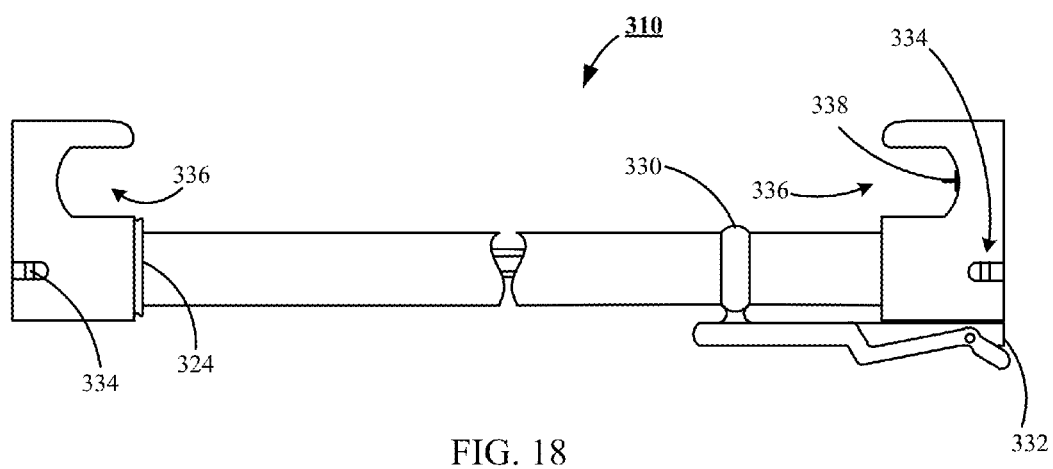
FIG. 18 shows a side view in elevation of the communication port of FIG. 16.

FIG. 17 further shows that each of the pair of confinement structures 316, provide a pair of controller docking pins 334, while FIG. 18 shows that each of the pair of confinement structures 316 further provide a computing device cradle 336, and that a select confinement structure of the pair of confinement structures 316 provides a computing device interface feature 338. The interface feature 338, facilitates at least, but not limited to, the provision of power to the computing device 302.

Figure 19:
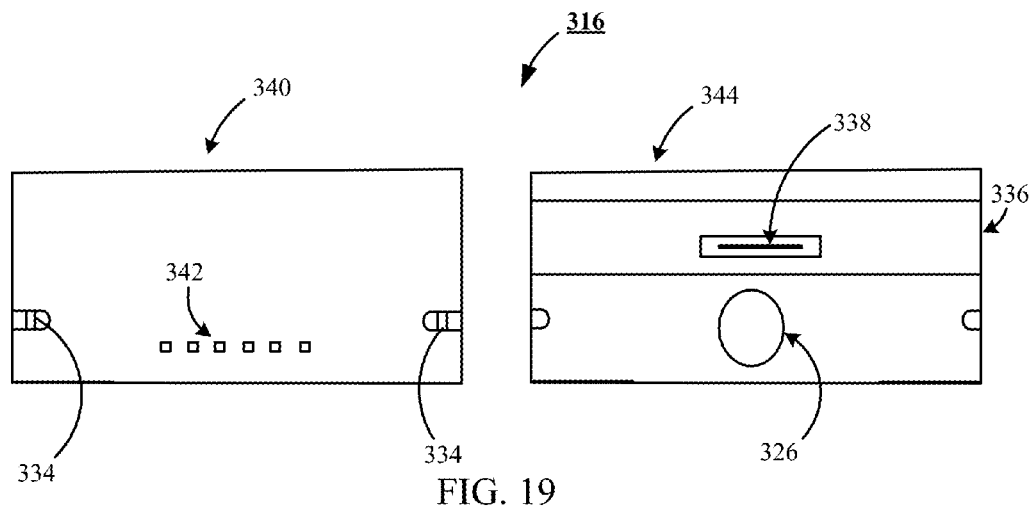
FIG. 19 shows front and back views in elevation of a first selected confinement structure of the pair of confinement structures of the communication port of FIG. 16.

FIG. 19 shows a front view 340, of a first selected confinement structure of the pair of confinement structures 316, which reveals a plurality of signal input lands 342 for use in receiving signals from the input device 318, of FIG. 16, and the pair of controller docking pins 334.

Further shown by FIG. 19, is a back view 344 of the first selected confinement structure of the pair of confinement structures 316, which reveals computing device interface feature 338, the computing device cradle 336, and the slip fit 326.

Figure 20:
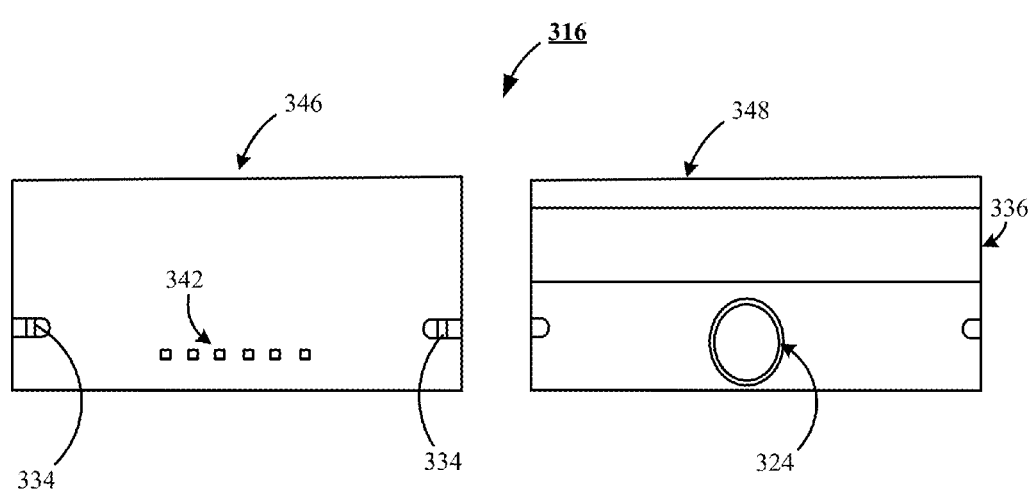
FIG. 20 shows front and back views in elevation of a second selected confinement structure of the pair of confinement structures of the communication port of FIG. 16.

FIG. 20 shows a front view 346, of a second selected confinement structure of the pair of confinement structures 316, which reveals a plurality of signal input lands 342 for use in receiving signals from the input device 318, of FIG. 16, and the pair of controller docking pins 334.

Further shown by FIG. 20, is a back view 348 of the second selected confinement structure of the pair of confinement structures 316, which reveals, the computing device cradle 336, and the solid connection 324.

Figure 21:
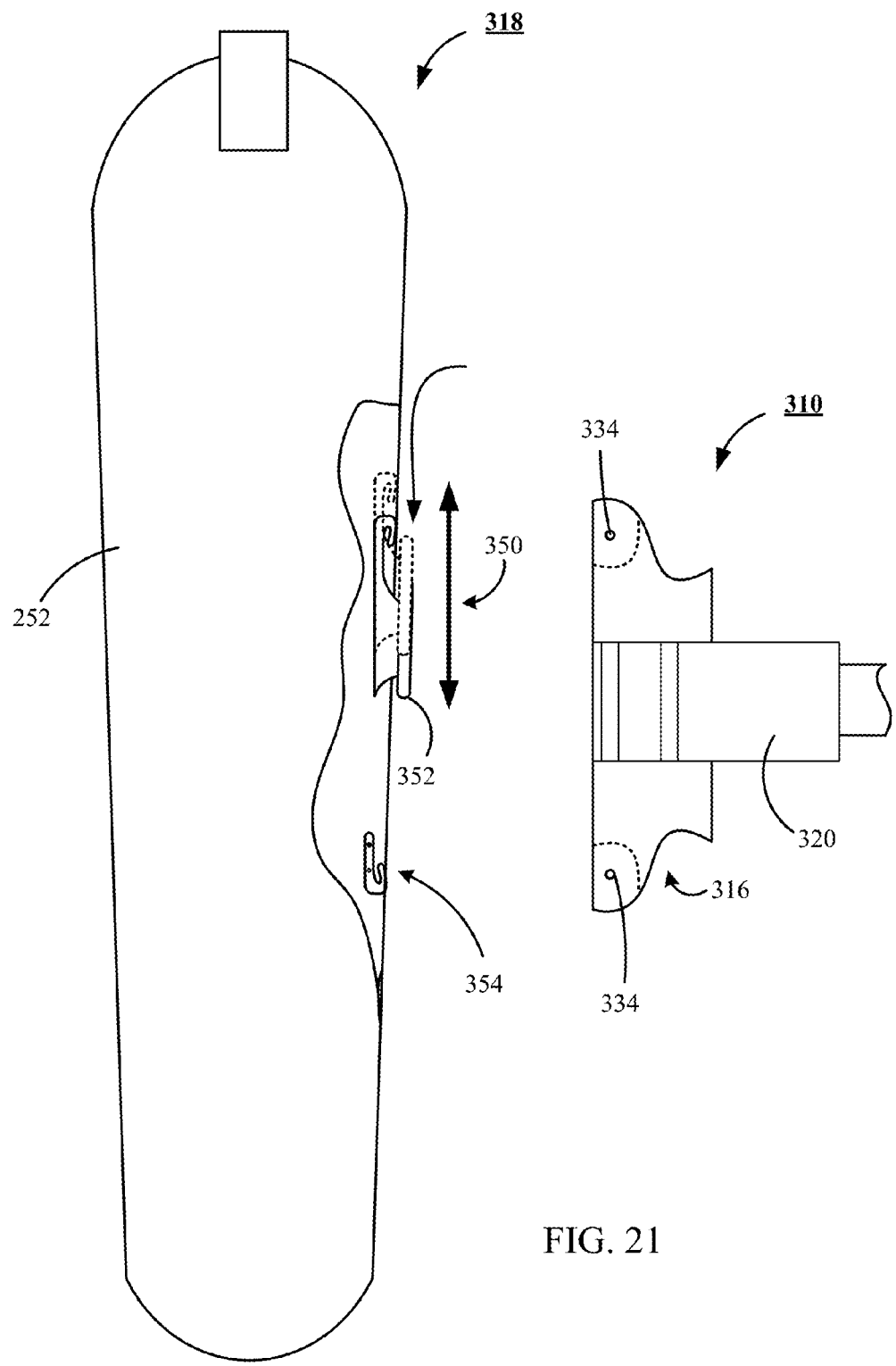
FIG. 21 shows a bottom plan view of a first control module adjacent to a selected confinement structure of the pair of confinement structures of the communication port of FIG. 16.

FIG. 21 reveals, for purposes of disclosure and for consistency of views with remaining disclosed figures of an embodiment, a bottom right hand plan view of the input device 318 adjacent the second selected confinement structure of the pair of confinement structures 316, of the communication port 310. Preferably, the control module 252, provides an attachment structure 350, cooperating with the controller docking pins 334, of the communication port 310. The attachment structure 350, secures the input device 318, to the communication port 310. In a preferred embodiment, the attachment structure 350 provides a sliding locking toggle 352, and a fixed locking toggle 354. In the embodiment presented, the sliding locking toggles, 352, interact with the controller docking pins 334, to securely (but removable) fasten the input device 318 to the communication port 310. In a preferred embodiment, the sliding locking toggle 352 is selectively adjustable from an open position, shown in dashed lines, and a closed, or locked position, as shown in solid lines.

Figure 22:
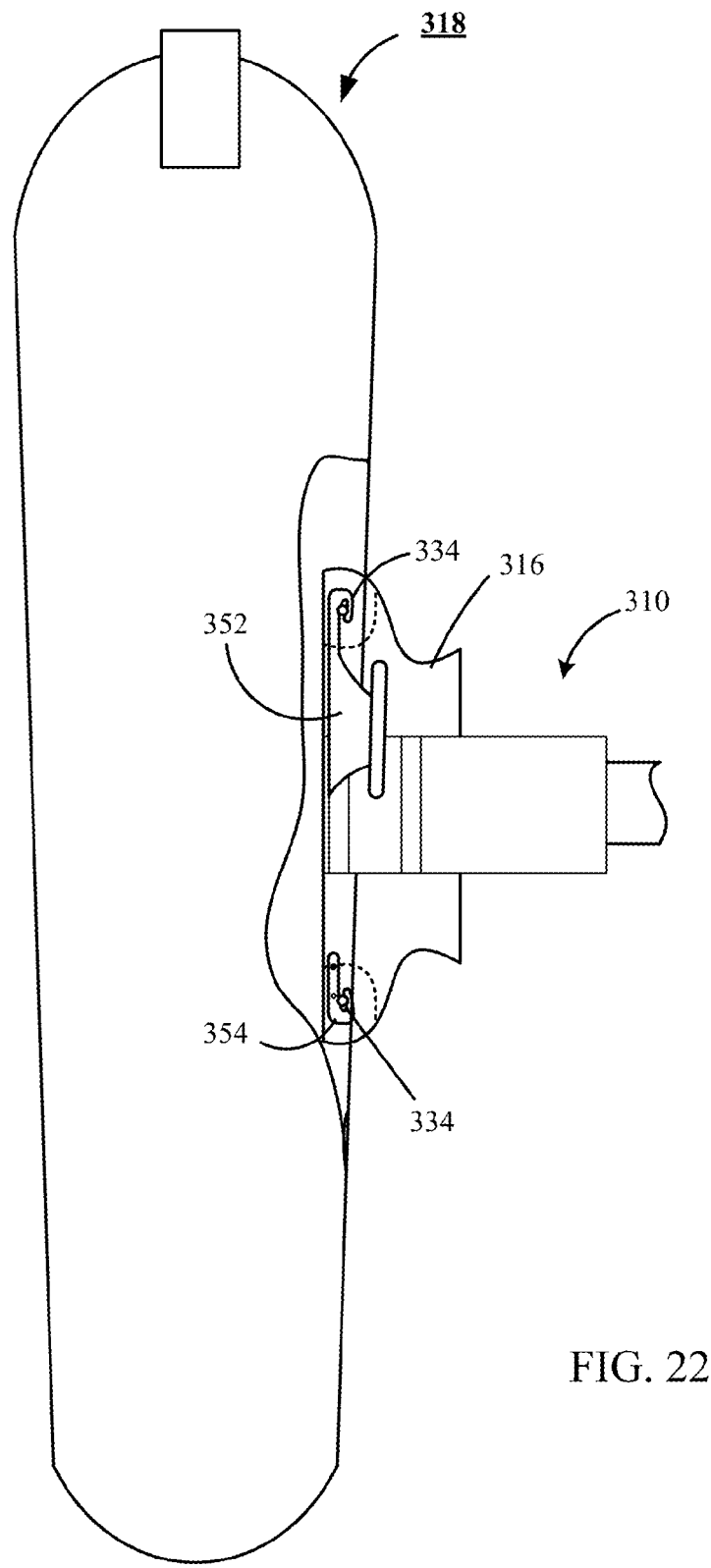
FIG. 22 shows a bottom plan view of a first control module secured to a selected confinement structure of the pair of confinement structures of the communication port of FIG. 16.
Figure 23:
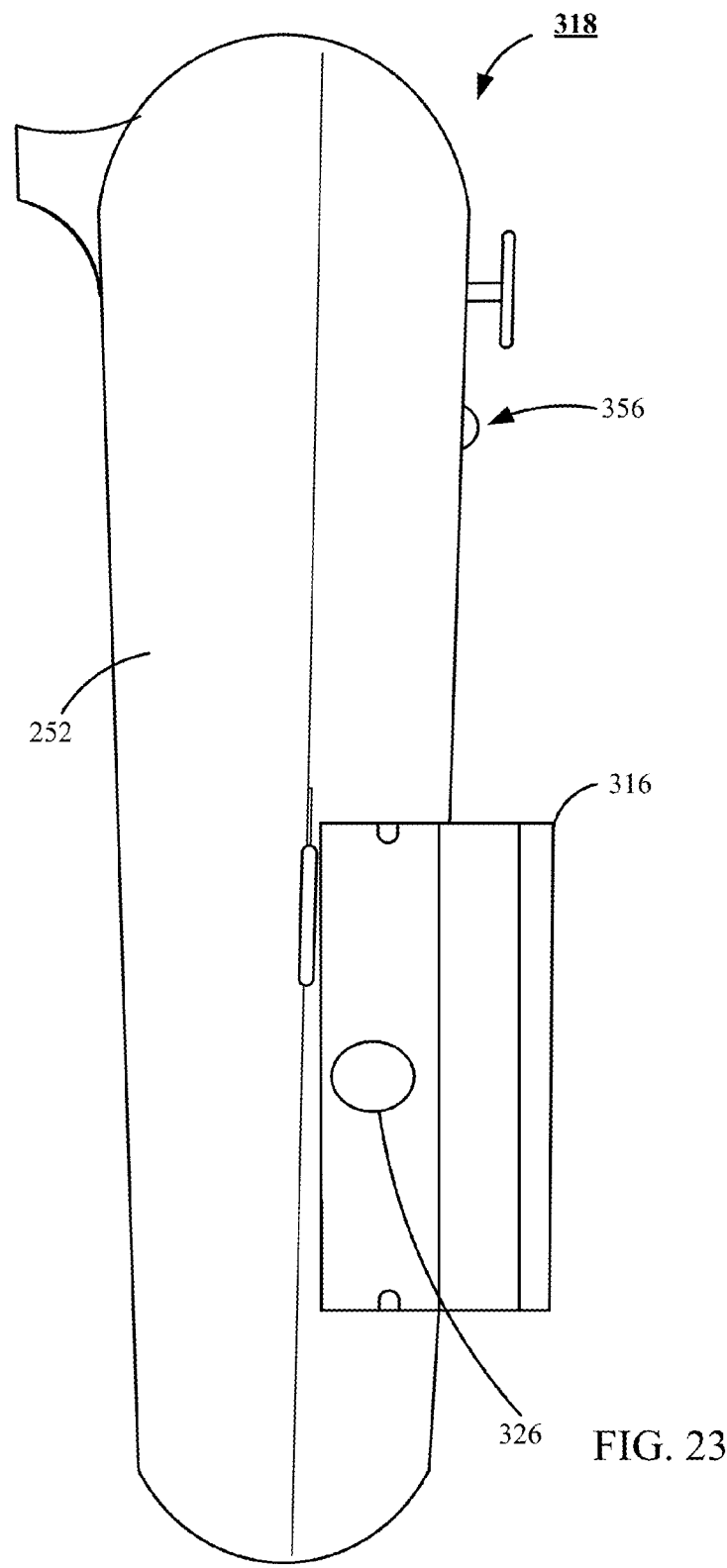
FIG. 23 shows a side views in elevation of a first control module secured to a selected confinement structure of the pair of confinement structures of the communication port of FIG. 16.

FIG. 22 shows the input device 318, securely fastened to the communication port 310, by way of the attachment structure 350, while FIG. 23 shows the right control module 252, of the input device 318, with its accompanying attachment structure 350 in a locked position, and the special relationship of the control module 252, relative to the confinement structure 316. FIG. 23 further shows an instructional input device 356, such as 120 of FIG. 11, or 256 of FIG. 13, which in a preferred embodiment is a removable instructional input device 356.

Figure 24:
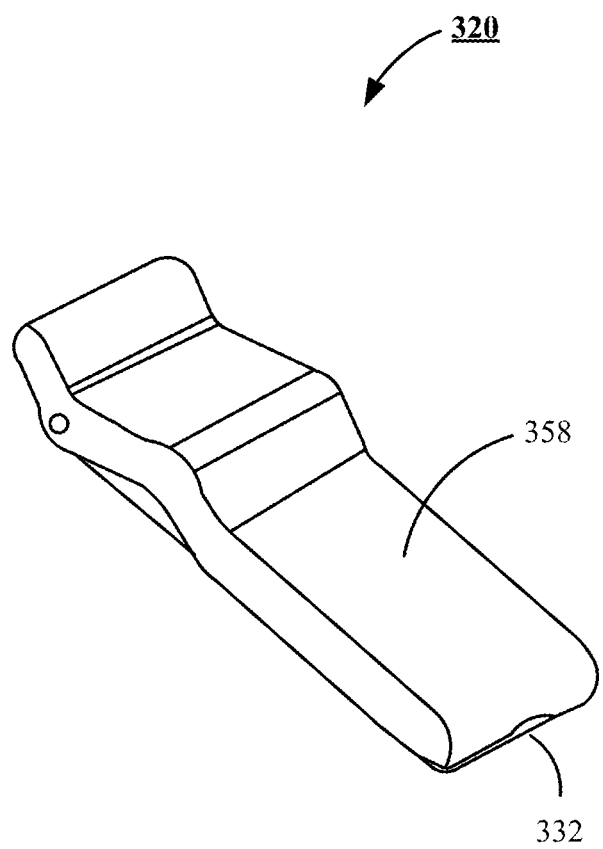
FIG. 24 shows a view in perspective of a fastening mechanism of the communication port of FIG. 16.

FIG. 24 provides a more insightful presentation of a latch portion 358, of the fastening mechanism 320, relative to the attachment member 332, of the fastening mechanism 320.

Figure 25:
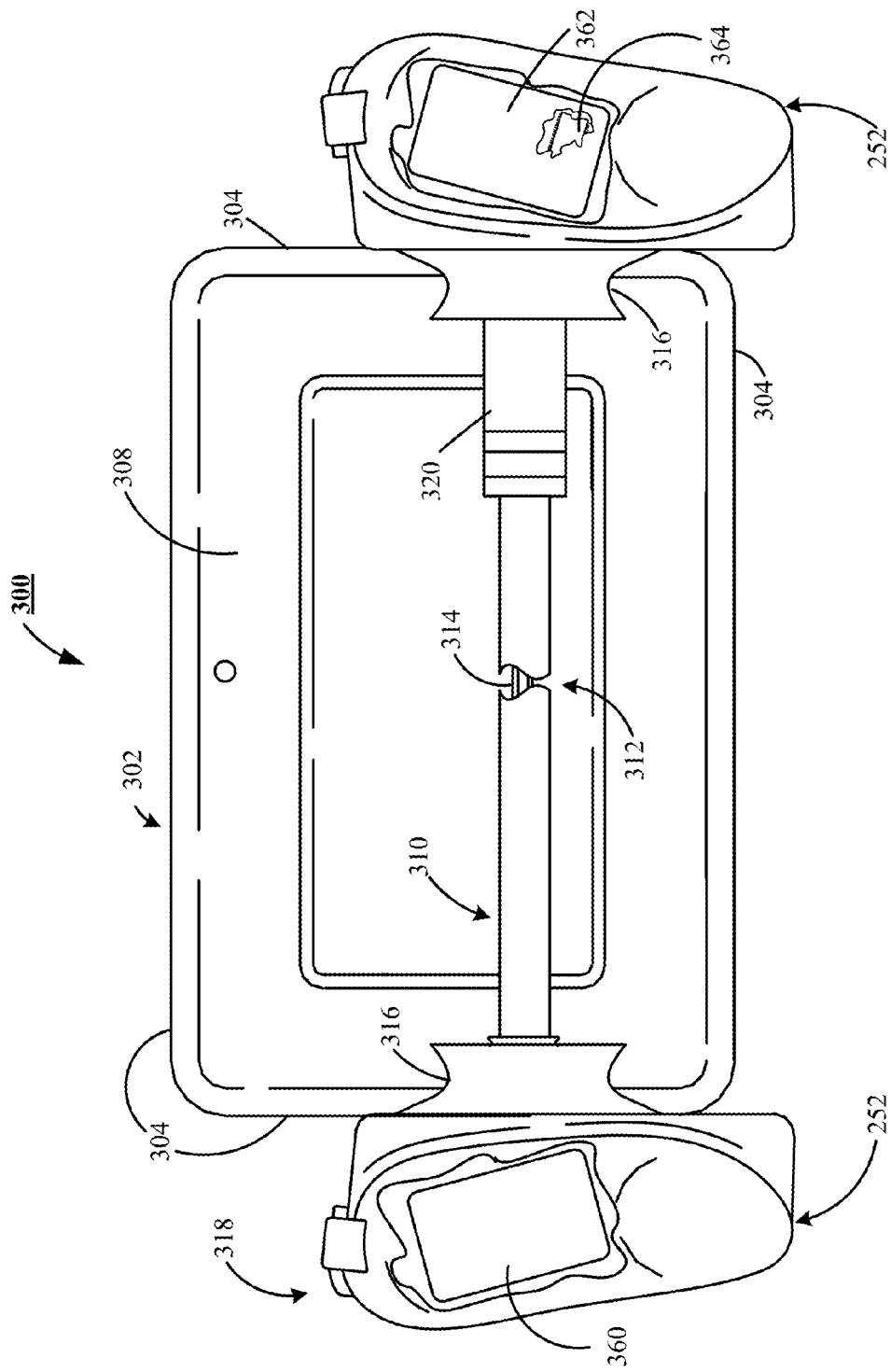
FIG. 25 shows a back plan view of the combination computing device and electronic game control of FIG. 16 revealing, in cutout, a data storage device and an auxiliary power source.

FIG. 25 shows that in a preferred embodiment, the input device 318, includes an auxiliary power source 360, and an auxiliary data storage device 362, which preferably includes a cache portion 364.

Figure 26:
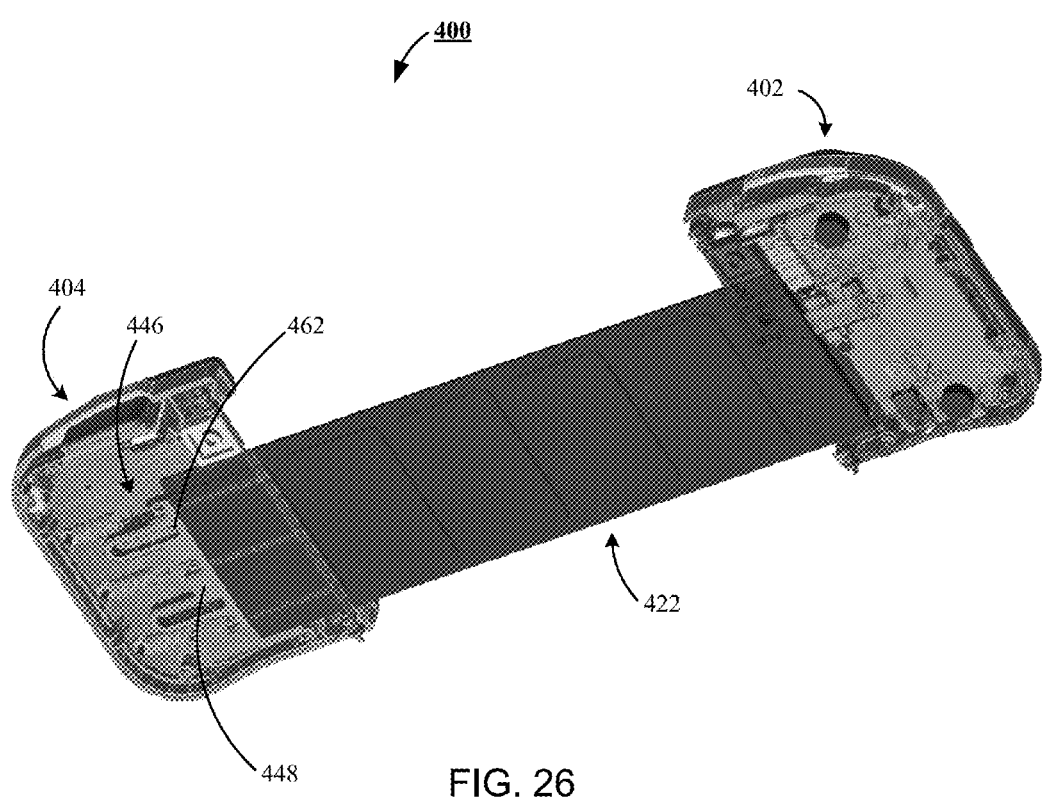
FIG. 26 shows a front perspective view, with partial cutaway, of an alternate embodiment of an electronic game

FIG. 26 shows a front perspective view, with partial cutaway, of an alternate embodiment an electronic game control apparatus 400 (also referred to herein as an input device 400), constructed and operated in accordance with various embodiments disclosed and claimed herein. The input device 400 includes, but is not limited to, a first control module 402, and a second control module 404. The control modules (402, 404) are adjacent to and confine a computing device 406 (of FIG. 30) on at least two opposing sides 408 and 410 (each of FIG. 30), of the plurality of sides of the computing device 406.

Figure 30:
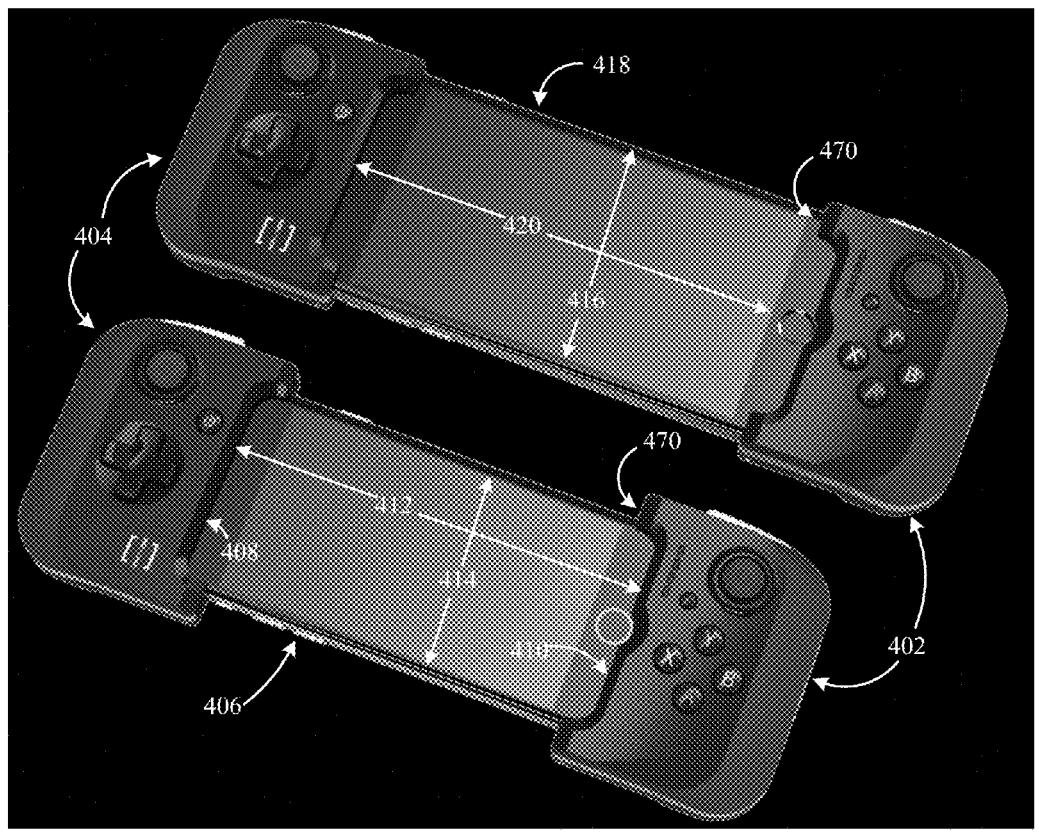
FIG. 30 shows a front perspective view of the electronic game control apparatus of FIG. 26, configured to accommodate computing devices of varying size.

In a preferred embodiment, the computing device 406 has a length 412, greater than its width 414, as shown by FIG. 30. The pair of control modules (408, 410) are preferably configured such that the pair of control modules (408, 410) adaptively and snugly accommodate the width 414, of the computing device 406. Alternatively the pair of control modules (408,410) adaptively and snugly accommodate a width 416 (of FIG. 30), of a second computing device 418 (of FIG. 30). Preferably, the width 416, of the second computing device 418, is greater than the width 414, of the computing device 406, and preferably, the second computing device 418, has a length 420 (of FIG. 30) greater than the width 414, of the second computing device 418.

Preferably, the input device further provides a structural bridge 422, which secures the pair of control modules (402, 404), one to the other. The structural bridge 422 is preferably configured such that the structural bridge 422, adaptively and snugly accommodate the length 412, of the computing device 406. Alternatively, the structural bridge 422, adaptively and snugly accommodate the length 420, of the second computing device 418. Preferably, the length 420 of the second computing device 418 is greater than the length 412, of the computing device 406. Without limitations imposed upon the accompanying claims, in a preferred embodiment, the structural bridge 422, is formed from a flexible material, such as a flexible polymer, or alternatively, from a semi-rigid material, such as a semi-rigid polymer, fiber glass, metallic sheet material, carbon fiber, or other materials known to artisans skilled in the art.

Figure 27:
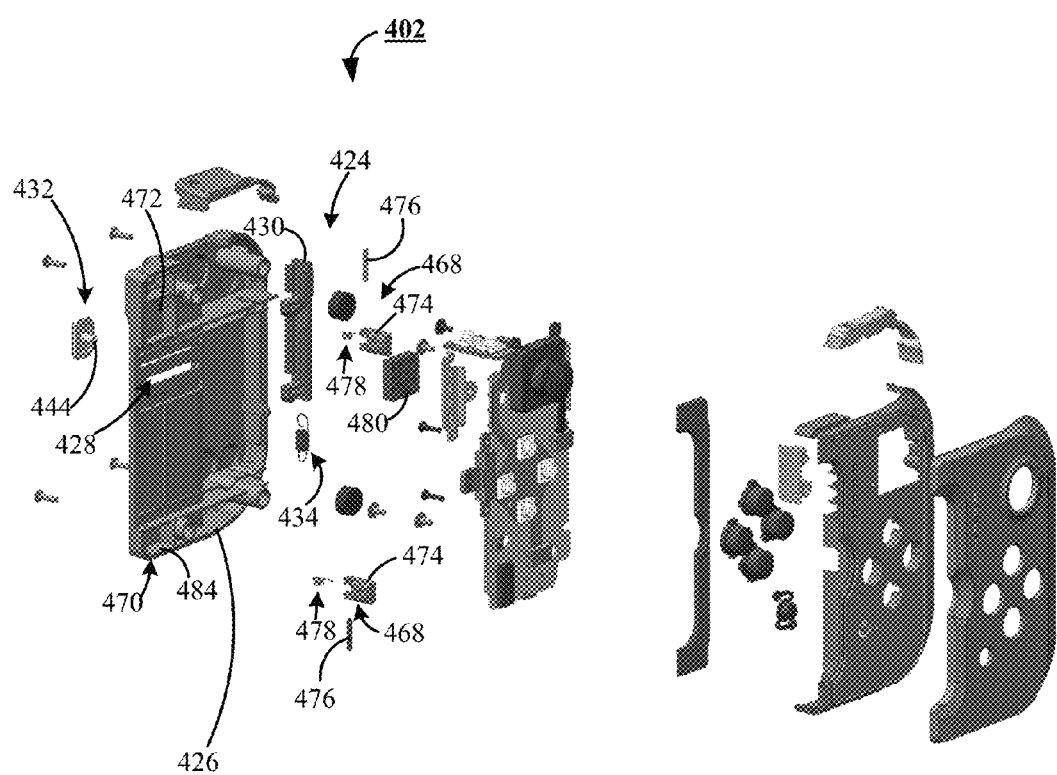
FIG. 27 shows an exploded view in perspective of a first control module of an input device of the electronic game control apparatus of FIG. 26.

FIG. 27 shows an exploded view in perspective of the first control module 402, of the input device 400, of FIG. 26. The first control module 402, of the pair of control modules (402, 404), preferably includes at least, but is not limited to, a retention mechanism 424, communicating with the structural bridge 422 (of FIG. 26), wherein the retention mechanism 424, secures the structural bridge 422 such that the structural bridge 422, adaptively accommodates the length of the computing device 406. Alternatively, the structural bridge 422 adaptively accommodates the length 420, of the second computing device 418. In a preferred embodiment, the length 420 of the second computing device 418 is greater than the length 412, of the computing device 406.

FIG. 27 further shows that the first control module 402 provides a base 426, which provides an adjustment feature 428. And preferably, the retention mechanism includes at least, but is not limited to, a boss 430, communicating with the structural bridge 422, and an adjustment structure 432, interacting with the boss 430, by way of the adjustment feature 428. In a preferred embodiment, the base 426 is disposed between the adjustment structure 432, and the boss 424.

Figure 29:
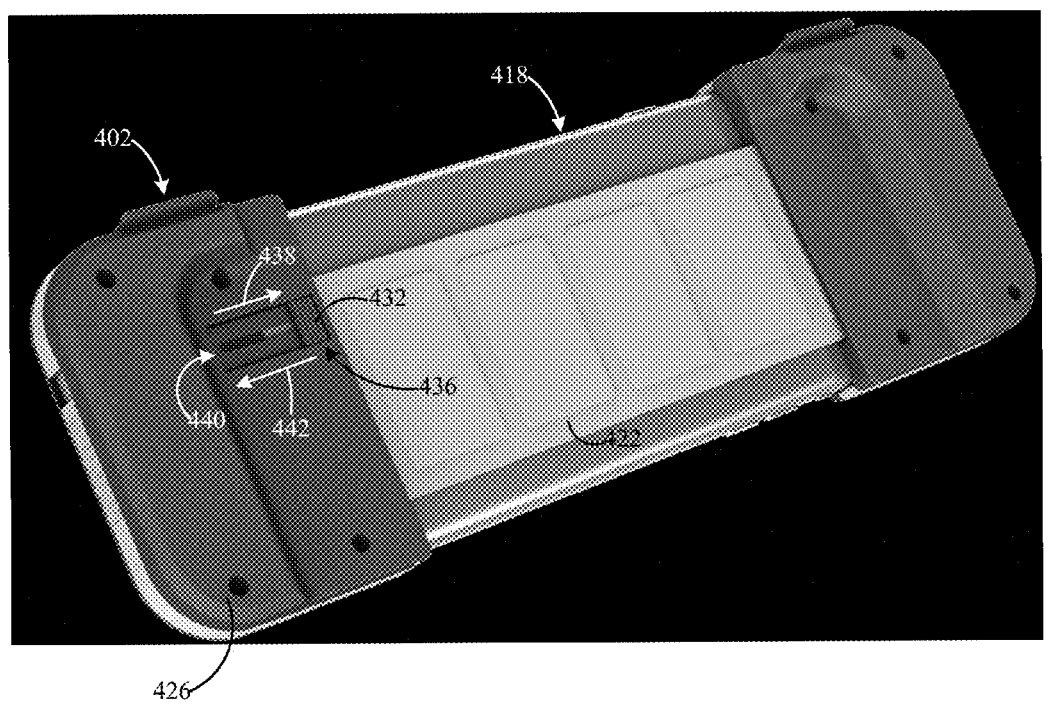
FIG. 29 shows a back perspective view of the electronic game control apparatus of FIG. 26.

The first control module 402, preferably provides a restraint 434, cooperating with the boss 430. As shown by FIG. 29, the restraint 434, retains the structural bridge 422, in a first position 436, relative to the base 426, when the adjustment structure 432, is activated in a first direction 438, relative to the base 426. When positioned in the first position 436, the structural bridge 422, accommodates the second computing device 418, as more clearly shown in FIG. 30.

The adjustment structure 432, further retains the structural bridge 422, in a second position 440, relative to the base 426, when the adjustment structure 432, is activated in a second direction 442, relative to the base 426. When positioned in the second position 440, the structural bridge 422, accommodates the first computing device 406, as shown by FIG. 30. To accommodate the first position 436, and the second position 440, preferably the boss 432 provides a constraint feature 444, which cooperates with the base 426. The constraint feature 444, maintains the structural bridge 422, in the first position 436, relative to the base 426, following an activation of the adjustment structure 432, in the first direction 438. The constraint feature 444, further maintains the structural bridge 422, in the second position 440, relative to the base 426, following an activation of the adjustment structure 432, in the second direction 442. The second direction 442 is a direction opposite that of the first direction 438, and in the preferred embodiment, the restraint 434, is a spring member.

Figure 28:
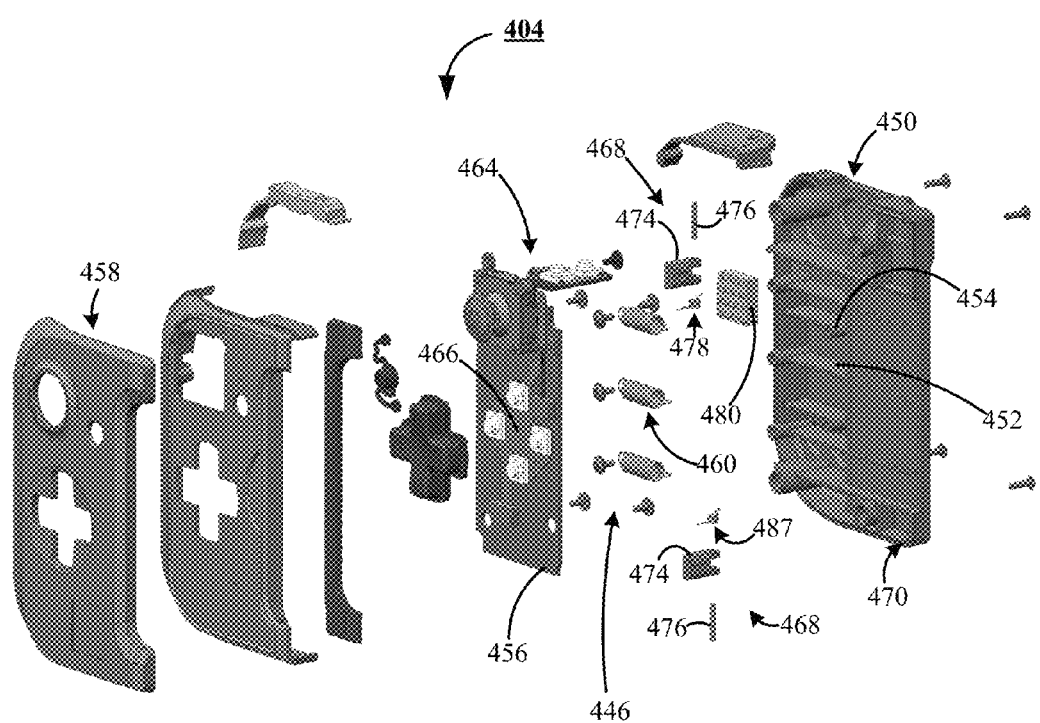
FIG. 28 shows an exploded view in perspective of a second control module of the input device of the electronic game control apparatus of FIG. 26.

FIG. 28 shows an exploded view in perspective of the second control module 404, of the input device 400, of FIG. 26. The second control module 404, includes at least but is not limited to, a tensioning mechanism 446, communicating with the structural bridge 422, by way of a fastening mechanism 448 (also referred to herein as an attachment stay 448), of the tensioning mechanism 446 secured to the structural bridge 422, as shown by FIG. 26.

The tensioning mechanism 446, secures the structural bridge 422, to a bottom cover 450, of the second control module 404, such that the structural bridge 422, cooperating with the tensioning mechanism 446, snugly accommodates the length 412 (of FIG. 30), of the computing device 406 (of FIG. 30). Alternatively, the tensioning mechanism 446, secures the structural bridge 422 to the bottom cover 450, of the second control module 404, such that the structural bridge 422, cooperating with the tensioning mechanism 446, snugly accommodates the length 420 (of FIG. 30) of the second computing device 418 (of FIG. 30). In a preferred embodiment, the length 420, of the second computing device 418, is greater than the length 412, of the computing device 406.

In a preferred embodiment, the bottom cover 450, provides a position guide 454, and the tensioning mechanism 446, includes at least, but not limited to, the attachment boss 452, communicating with the structural bridge 422, an attachment support 456, cooperating with the attachment boss 452. Preferably, the attachment support 456, in cooperation with the attachment boss 452, confines the structural bridge 422 vertically, but permits lateral movement of the structural bridge 422 relative to the bottom cover 450.

Preferably, the structural bridge 422, is disposed between the bottom cover 450, and a top cover 458, which cooperates with the bottom cover 450, to facilitate lateral movement of a portion of the structural bridge 422, from its position associated with the first position 432 (of FIG. 29) of the adjustment structure 432 (of FIG. 29), to its position associated with the second position 440 (of FIG. 29) of the adjustment structure 432, while a biasing structure 460, communicating with the attachment stay 448 (of FIG. 26), provides variable tension between the structural bridge 422, and the second control module 404, thereby accommodating a predetermined amount of lateral movement of the structural bridge 422, relative to the bottom cover 450, as shown by FIG. 26.

In a preferred embodiment, the attachment stay 448, includes at least, but not limited to, a guide aperture 462, which is preferably slotted, interacting with a position guide 454, of the attachment boss 452. The interaction of the guide aperture 462, with the position guide 454, limits the extent of lateral alignment between the structural bridge 422, and the second control module 404. As further shown by FIG. 28, in a preferred embodiment, the attachment support 456, further supports a plurality of control switches 464, interacting with a circuit structure 466, which preferably is a flex circuit 466, the biasing structure 460, is a coiled spring 460.

Preferably, each of the pair of control modules 402 of FIG. 27 and 404 of FIG. 28, include at least, but not limited to, a sizing mechanism 468, communicating with a computing device 406 (of FIG. 30), else a second computing device 418 (of FIG. 30). In a preferred embodiment, the sizing mechanism 468 is configured such that the sizing mechanism 468 adaptively accommodate the width 414, of the computing device 406. Alternatively the sizing mechanism 468, adaptively accommodate the width 416, of the second computing device 418. In a preferred embodiment, the width 416, of the second computing device 418, is greater than the width 414, of the computing device 406.

As shown by FIG. 27, the control module 402 includes the base 426, which provides a sizing toggle confinement structure 470, and a slide support confinement structure 472. Preferably, the sizing mechanism 468 includes at least, but is not limited to, a sizing toggle 474, communicating with the sizing toggle confinement structure 472, a sizing toggle restraint 476, interacting with the sizing toggle confinement structure 472, the sizing restraint 476, promotes rotation of the sizing toggle 474, relative to the base 426.

In a preferred embodiment, the sizing mechanism further includes a torsional force structure 478, cooperating with the base 426, and acting on the sizing toggle 474. The torsional force structure 478, facilitating the sizing toggle 474, in a first position under a first torsional force. When in the first position, the sizing toggles 474 extend vertically from the base 450, and the control module 402 is configured to accommodate the width 410, of the computing device 406. Alternatively, the torsional force structure 478, facilitating the sizing toggle 474, in a second position under a second torsional force. When in the second position, the sizing toggles 474, lies nested in the sizing toggle confinement structure 472, and horizontal the base 450, and the control module 402 is configured to accommodate the width 416, of the second computing device 418. Preferably, the second torsional force is greater than the first torsional force, and the width 416, of the second computing device 418, is greater than the width 414, of the computing device 406.

In a preferred embodiment, the control module 402 further provides a computing device slide pad 480, nested in the slide support confinement structure 472. The computing device slide pad 480 is configured to deliver minimal sliding friction between the computing device 406, or the second computing device 418, and the control module 402, when inserting either computing device (406, 418) into the control module 402. Likewise, the sizing toggle 474 is configured to deliver minimal sliding friction between the computing device 406, or the second computing device 418, and the control module 402, when inserting either computing device (406, 418) into the control module 402.

Preferably, the torsional force structure 478, is a coiled spring, and the sizing toggle confinement structure 470, provides a friction surface 482, which mitigates an inadvertent movement of the sizing toggle 474, from the first position to the second position when the computing device 406, is constrained by the input device 400.

Figure 31:
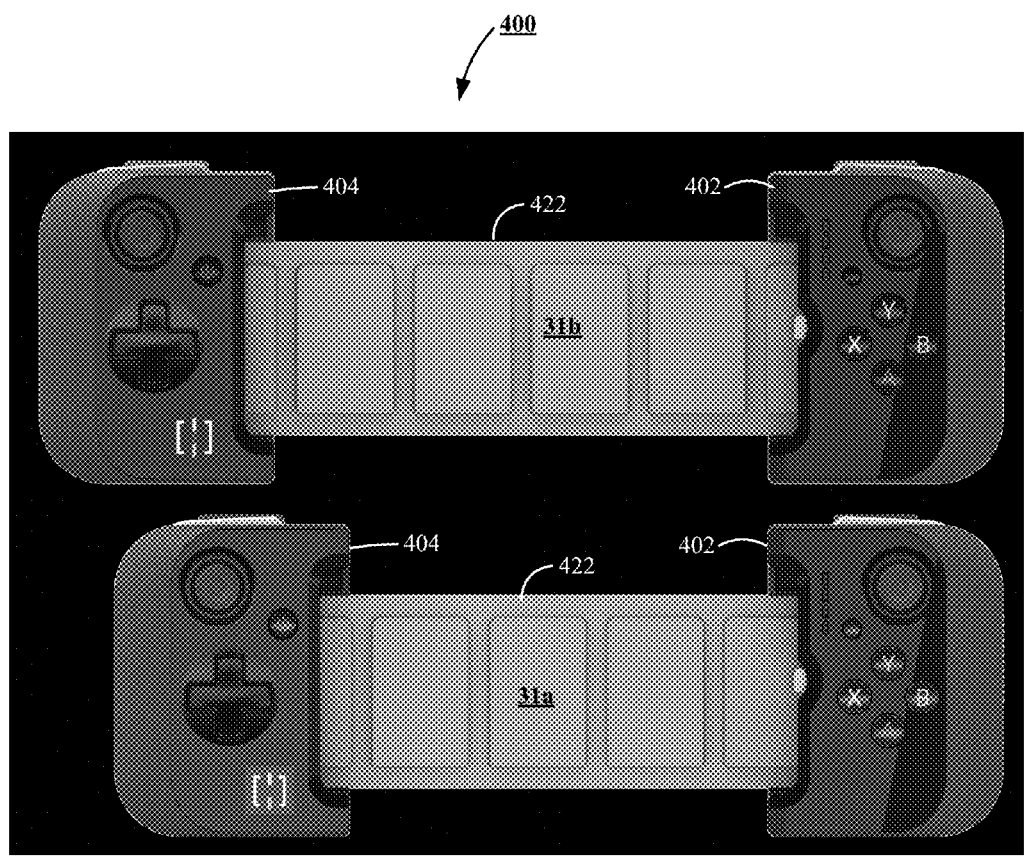
FIG. 31 shows a back perspective view of the electronic game control apparatus of FIG. 26, configured to accommodate computing devices of varying size.

Turning to FIG. 31, shown therein are FIGS. 31a and 31b. As can be seen by FIG. 31a, the control modules (402, 404), and the structural bridge 422, of input device 400, are positioned, relative to one another, to accommodate the computing device 406 (of FIG. 30). While as can be seen by FIG. 31b, the control modules (402, 404), and the structural bridge 422, of input device 400, are positioned, relative to one another, to accommodate the second computing device 418, of FIG. 30.

FIGS. 32, 33, and 34 collectively illustrate a preferred procedure to join the second computing device 418, with the control module 404. The first step in the procedure is to align the second computing device 418, with the control module 404, such that the corner of the second computing device 418, is adjacent the sizing toggle 474 as shown by FIG. 32. The next step in the procedure is to advance the second computing device 418, into contact with the sizing toggle 474, and continue to advance the second computing device 418, into the control module 404, which causes the sizing toggle 474, to rotate into the sizing toggle confinement structure 470, thereby permitting the second computing device 418 to be adaptively and snuggly accommodated by the control module 404.

Figure 35:
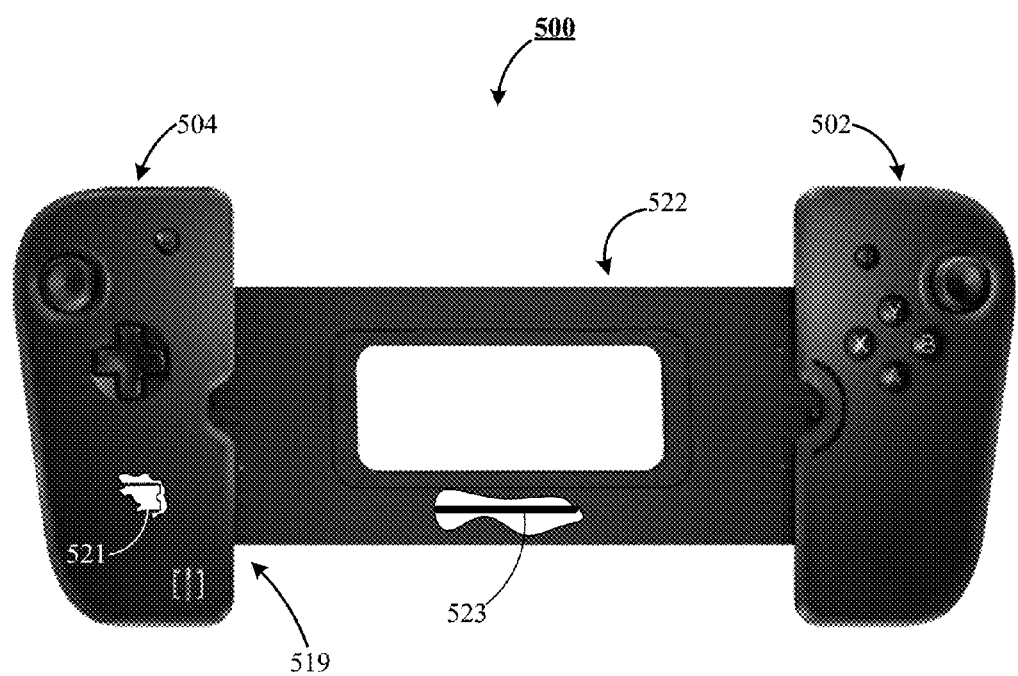
FIG. 35 shows a front view of an alternative embodiment of an electronic game control apparatus constructed and operated in accordance with various embodiments disclosed and claimed herein.
Figure 36:
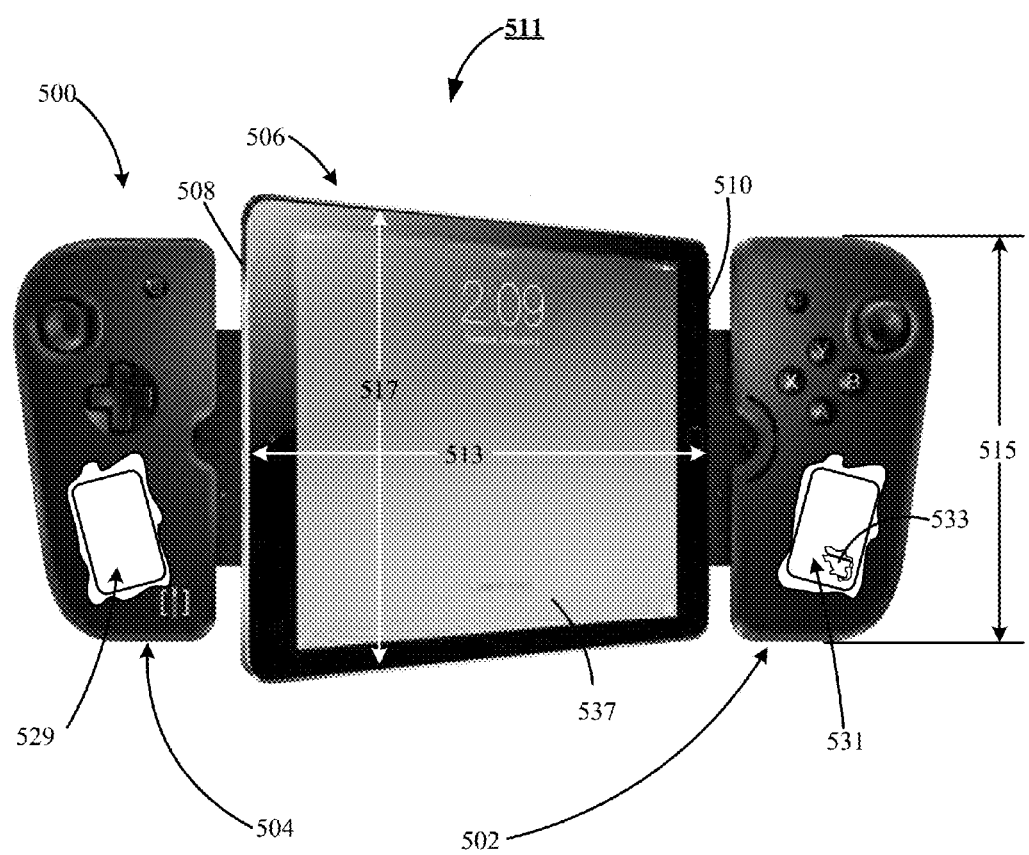
FIG. 36 shows a front view of an alternative embodiment of an electronic game control apparatus, and a front perspective view of a computing device, which interfaces with the electronic game control apparatus to form an electronic gaming system.

FIG. 35 shows a front view of an alternate embodiment of an electronic game control apparatus 500 (also referred to herein as an input device 500), constructed and operated in accordance with various embodiments disclosed and claimed herein. The input device 500 includes, but is not limited to, a first control module 502, and a second control module 504. The control modules (502, 504) are adjacent to and confine a computing device 506 (of FIG. 36) on at least two opposing sides 508 and 510 (each of FIG. 36), of the plurality of sides of the computing device 506. Collectively, and when joined together, by way of a structural bridge 522, the input device 500, and the computing device 506, form an electronic gaming system 511, as shown in FIG. 36.

In a preferred embodiment, the control module 504, incorporates the eternal mechanisms and features of the control module 404, of FIGS. 26 and 28, including the tensioning mechanism 446, but absent the sizing mechanism 468. While the control module 502, incorporates the eternal mechanisms and features of the control module 402, of FIGS. 26 and 27, but absent the adjustment feature 428, and the sizing mechanism 468. Accordingly, the input device 500 can accommodate computing devices of varying length and width by incorporating the tensioning mechanism 446, into control module 504, to accommodate a length 513, of the computing device 560, and configuring the control modules (502, 504) to allow the sides (508, 510) of the computing device 506, to protrude, or extend beyond the confines of a length 515, of the control modules (502, 504), in a vertical direction along a width 517, of the computing device 506.

In a preferred embodiment, as shown by FIG. 35, the structural bridge 522, secures the pair of control modules (502, 504) one to the other. Preferably, the structural bridge 522, is configured such that the structural bridge 522, adaptively and snugly accommodate the length 513, of the computing device 506, as shown in FIG. 36.

Figure 37:
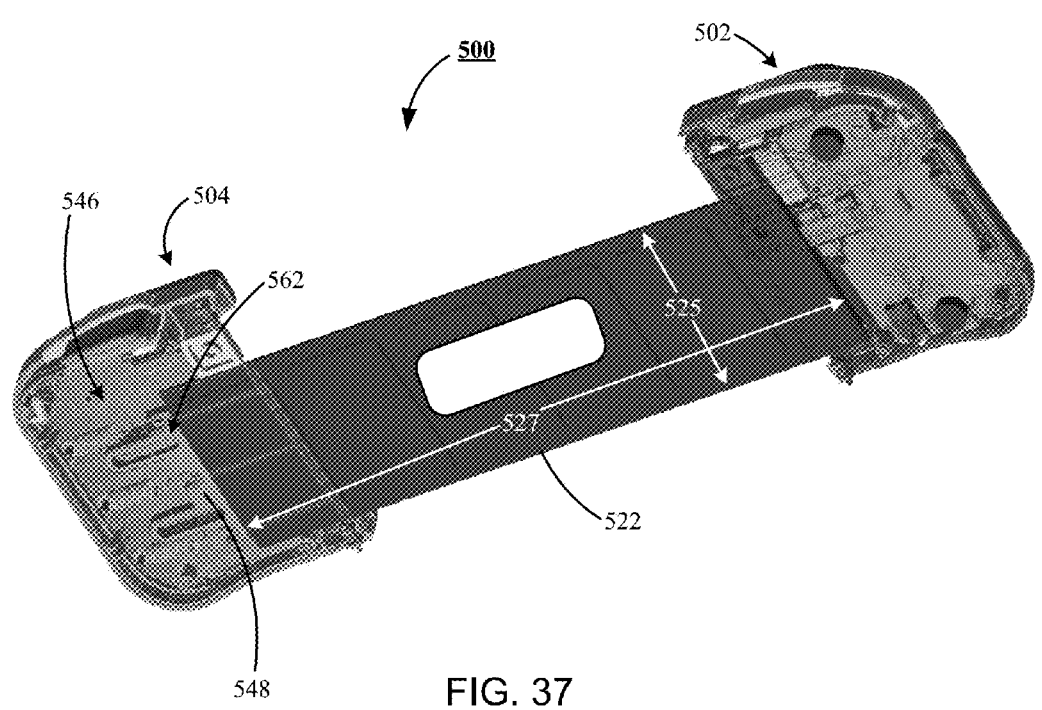
FIG. 37 shows a front perspective view, with partial cutaway, of the alternative embodiment of then electronic game control apparatus of FIG. 36, constructed and operated in accordance with various embodiments disclosed and claimed herein.

In a preferred embodiment, as shown by FIG. 37, the control module 504, includes at least, but is not limited to, a tensioning mechanism 546, communicating with the structural bridge 522. Preferably, the tensioning mechanism 546, secures the structural bridge 522, such that the structural bridge snugly accommodate the length 513 (of FIG. 36), of the computing device 506 (of FIG. 36).

In a preferred embodiment, as shown by FIG. 35, a communication link 519, is provided by the input device 500, which facilitating communication between the pair of control modules (502, 504) and the computing device 506 (of FIG. 36), and, as shown by FIG. 35, the structural bridge 522, masks a mid-portion of the back of the computing device.

Continuing with FIG. 35, in a preferred embodiment, the communication link 519, provides a communication module 521, and in the alternative, provides a signal pathway 523, for use in passing signals between the pair of control modules (502, 504). In a preferred embodiment, the communication module 521, is a wireless communication module 521, which operates in a frequency range of 2.4 GHz. In an alternate preferred embodiment, the wireless communication module 521, is a personal area network. As those skilled in the art, a personal area network (PAN) is a computer network used for communication among computerized devices, including telephones and personal digital assistants. PANs can be used for communication among the personal devices themselves (intrapersonal communication), or for connecting to a higher level network and the Internet (an uplink). A wireless personal area network (WPAN) is a PAN carried over wireless network technologies such as IrDA, Bluetooth, Wireless USB, Z-Wave, ZigBee, or even Body Area Network. The reach of a WPAN varies from a few centimeters to a few meters. A PAN may also be carried over wired computer buses such as USB and FireWire.

In an embodiment that utilizes the signal pathway 523, as the communication link 519, the signal pathway 523, may be in the form of a metallic conductor, a fiber optic conductor, a conductive polymer, or the conductive layer of a flex circuit. The skilled artisan will further appreciate that the structural bridge 522, may be either formed from a rigid material, such as a rigid polymer, or from a flexible material, such as a flexible polymer.

Figure 38:
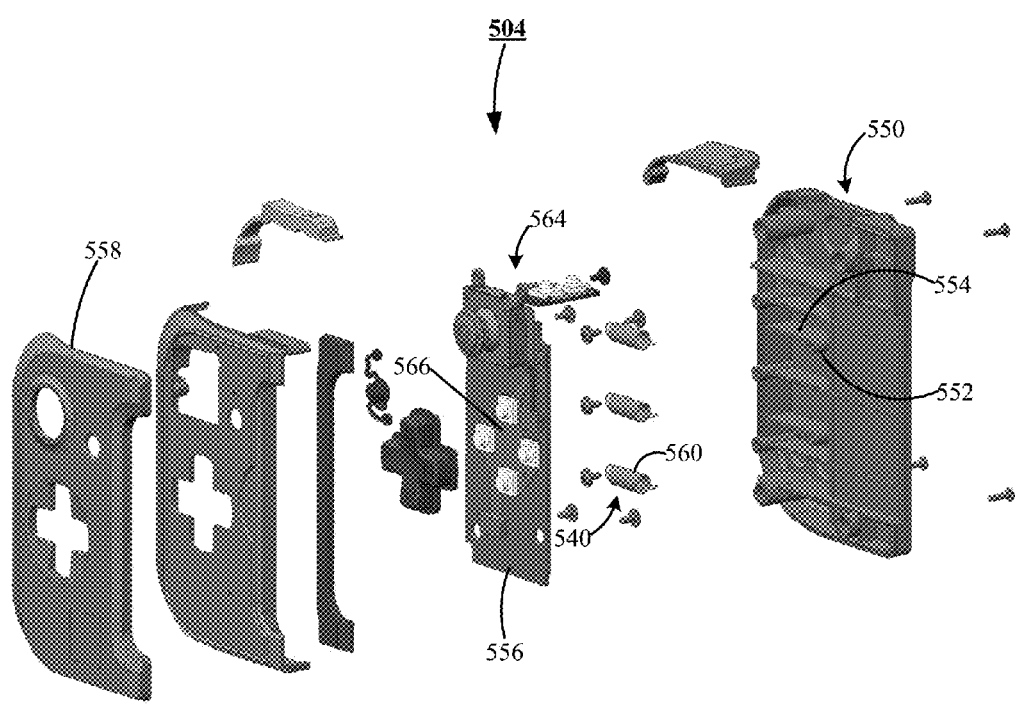
FIG. 38 shows an exploded view in perspective of a control module of the input device of the electronic game control apparatus of FIG. 37.

FIG. 38 shows an exploded view in perspective of the control module 504, of the input device 500, of FIG. 35. The control module 504, includes at least but is not limited to, a tensioning mechanism 546, communicating with the structural bridge 522, by way of a fastening mechanism 548 (also referred to herein as an attachment stay 548), of the tensioning mechanism 546 secured to the structural bridge 522, as shown by FIG. 37.

The tensioning mechanism 546, secures the structural bridge 522, to a bottom cover 550, of the control module 504, such that the structural bridge 522, cooperating with the tensioning mechanism 546, snugly accommodates the length 513 (of FIG. 36), of the computing device 506 (of FIG. 36).

In a preferred embodiment, the bottom cover 550, provides an attachment boss 552, supporting a position guide 554, and the tensioning mechanism 546, includes at least, but not limited to, the attachment boss 552, communicating with the structural bridge 522, an attachment support 556, cooperating with the attachment boss 552. Preferably, the attachment support 556, in cooperation with the attachment boss 552, confines the structural bridge 522 vertically, but permits lateral movement of the structural bridge 522, relative to the bottom cover 550.

Preferably, the structural bridge 522, is disposed between the bottom cover 550, and a top cover 558, which cooperates with the bottom cover 450, to facilitate lateral movement of a portion of the structural bridge 522. Preferably, a biasing structure 560, communicating the attachment stay 548 (of FIG. 37), provides variable tension between the structural bridge 522, and the second control module 504, thereby accommodating a predetermined amount of lateral movement of the structural bridge 522, relative to the bottom cover 550, as shown by FIG. 37.

As shown by FIG. 37, in a preferred embodiment, the attachment stay 548, includes at least, but not limited to, a guide aperture 562, which is preferably slotted, interacting with the position guide 554, of the attachment boss 552 (of FIG. 38). The interaction of the guide aperture 562, with the position guide 554, limits the extent of lateral alignment between the structural bridge 522, and the control modules (502, 504). As further shown by FIG. 38, in a preferred embodiment, the attachment support 556, further supports a plurality of control switches 564, interacting with a circuit structure 566, which preferably is a flex circuit 566, and the biasing structure 560, is preferably a coiled spring 460.

In a preferred embodiment, the structural bridge 522, provides a width 525, less than its length 527, as shown by FIG. 37, and the back of the computing device 506, extending above and below the width 525, of the structural bridge 522.

Returning to FIG. 36, in a preferred embodiment, the input device 500, includes an auxiliary power source 529, and an auxiliary data storage device 531, which preferably includes a cache portion 533. Preferably, the auxiliary power source 529, is a lithium ion battery, which provides power to the input device 500, and the computing device 506, when the power source of the computing device 506 is depilated; and the auxiliary data storage device 531 is preferably a solid state hard drive.

Figure 39:
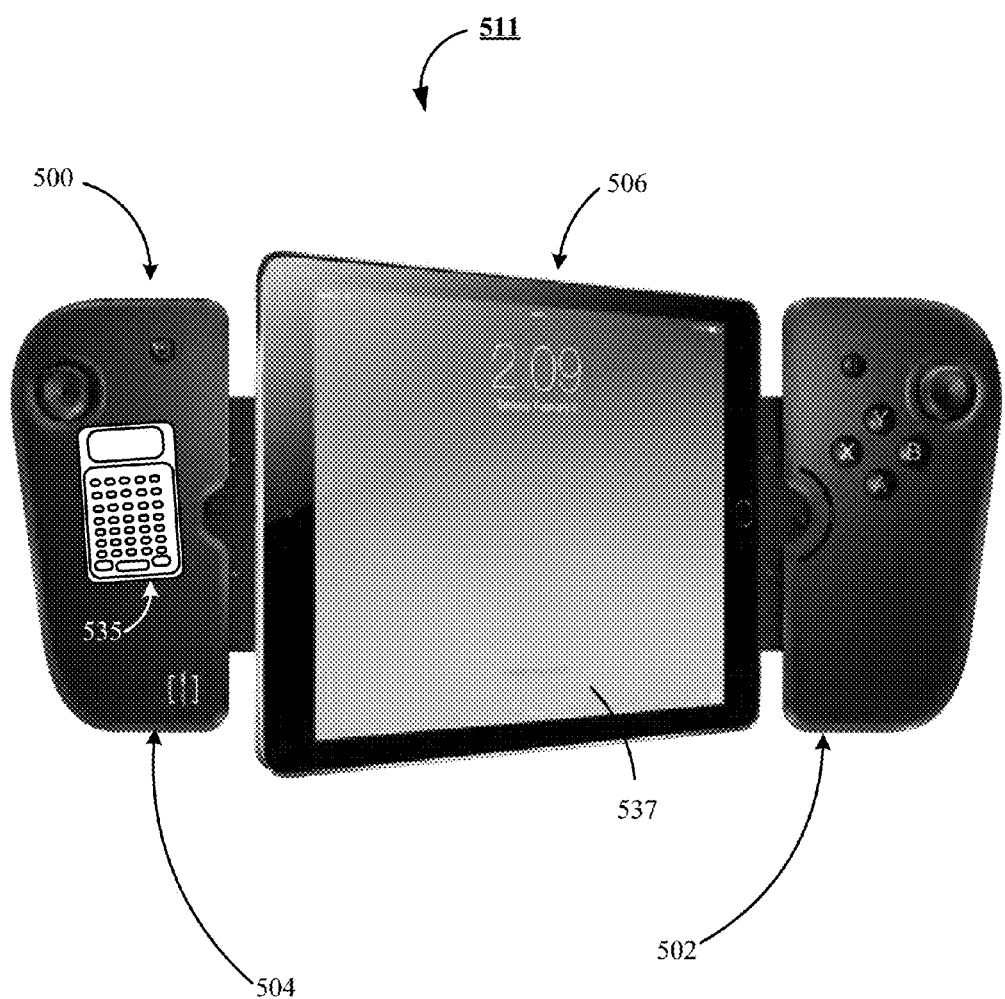
FIG. 39 shows a front view of the alternative embodiment of the electronic gaming system of FIG. 36, with a keyboard integrated into the control module of FIG. 38.

FIG. 39 shows a further embodiment of the electronic gaming system 511, in which the input device 500, provides a keyboard module 535, and in which the keyboard module 535, passes signals to the computing device 506, the signals control images displayed on the display screen 537, of the computing device 506.

Figure 40:
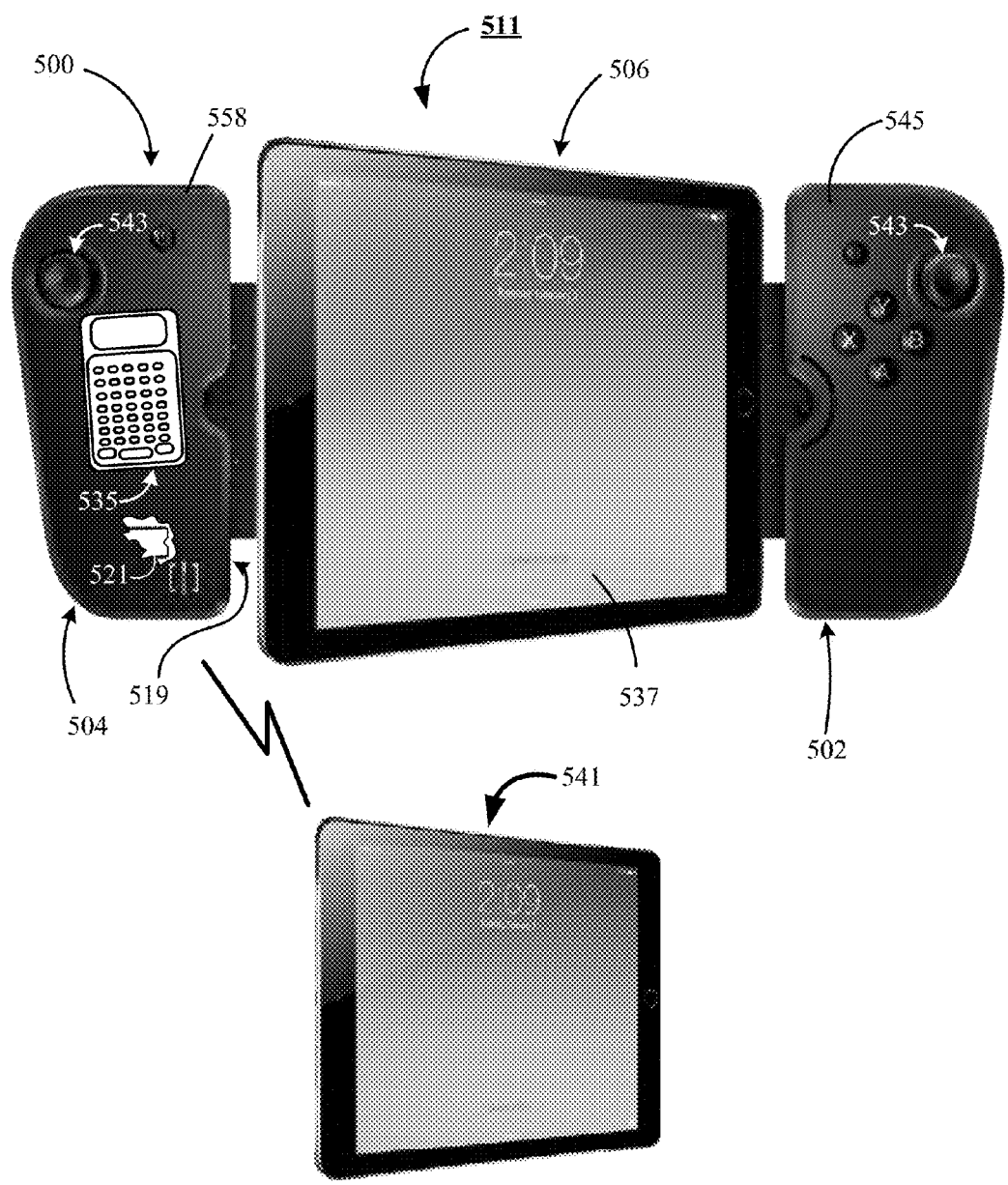
FIG. 40 shows a front view of the alternative embodiment of the electronic gaming system of FIG. 39, interacting with wirelessly with a display.

FIG. 40 shows a still further embodiment of the electronic gaming system 511, in which the input device 500, provides the keyboard module 535, and in which the keyboard module 535, passes signals to the computing device 506, the signals control images displayed on the display screen 537, of the computing device 506. FIG. 40 further shows that the communication link 519, via the communication module 521, is further configured to communicate with a second display 541 wirelessly. That is the second display 541, is remote from and mechanically disassociated from the electronic display screen 537, of the computing device 506.

Continuing with FIG. 40, preferably each control module (502, 504) provides a directional control device 543. In a preferred embodiment, each direction control device 543, is configured to facilitate a first position adjacent the top cover 558, of control module 504, or a first position adjacent a top cover 545, of control module 502, and a second position, the second position displaced a predetermined vertical distance away from the first position. Further in the preferred embodiment, each directional control module 543 is a joystick.

Figure 41:
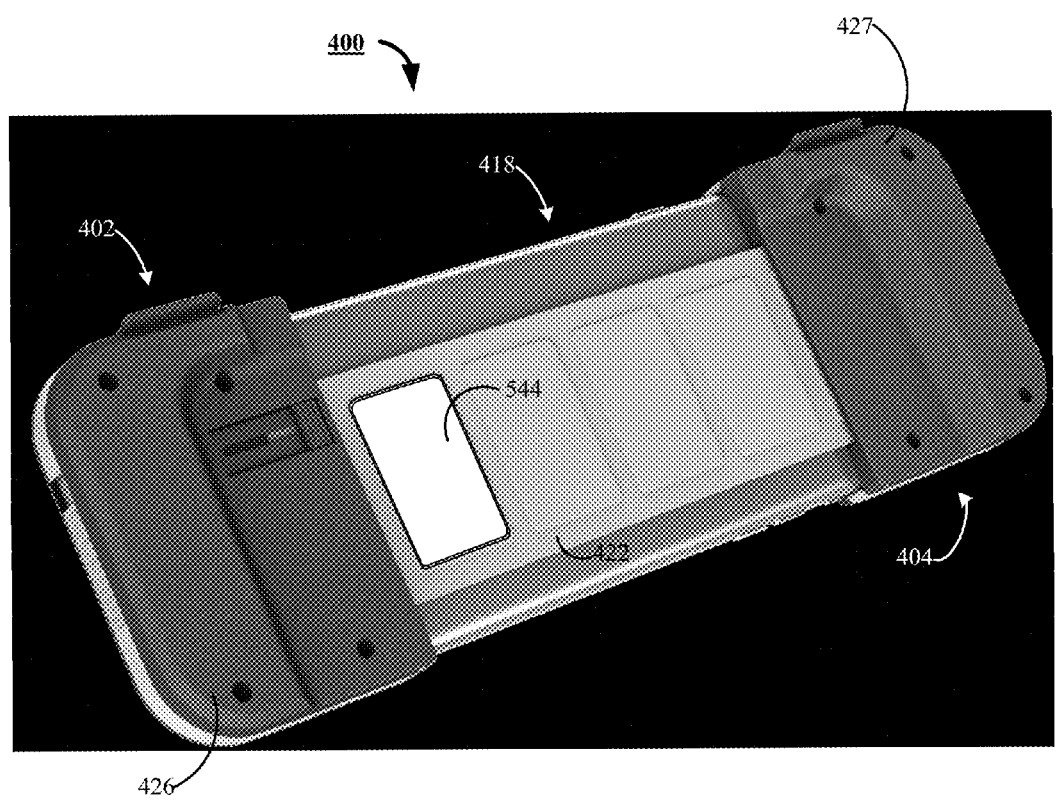
FIG. 41 shows a back view of the alternative embodiment of the electronic gaming system of FIG. 37, with a touch sensitive module attached to a back side of the structural bridge of the electronic gaming controller.

FIG. 41 discloses the electronic game control apparatus 400 (also referred to herein as an input device 400), which in a preferred embodiment provides the first control module 402, the second control module 404, and the structural bridge 422, which collectively secures the computing device 418. In a preferred embodiment, a back of the structural bridge 422, supports a touch sensitive control module 544, which in a preferred embodiment is a touch screen 544.

Figure 42:
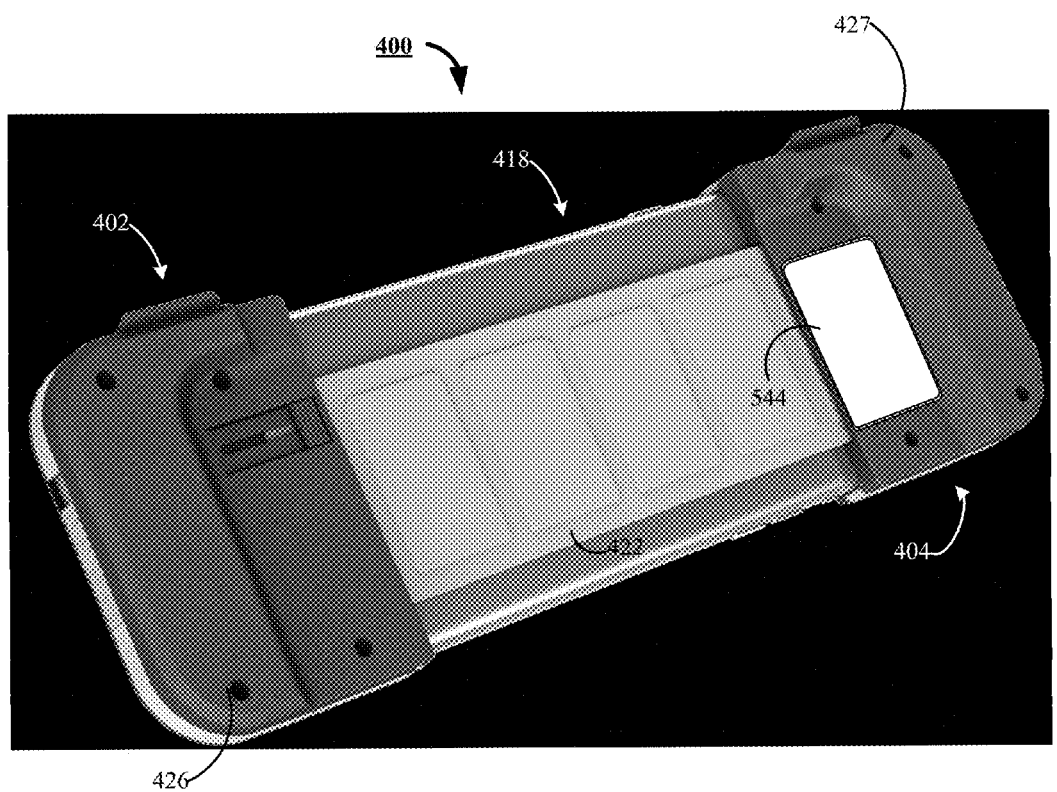
FIG. 42 shows a back view of an alternate, alternative embodiment of the electronic gaming system of FIG. 37, with a touch sensitive module attached to a back side of one of the control modules of the electronic gaming controller.

FIG. 42 discloses the electronic game control apparatus 400 (also referred to herein as an input device 400), which in a preferred embodiment provides the first control module 402, the second control module 404, and the structural bridge 422, which collectively secures the computing device 418. In a preferred embodiment, a back 427, of the second control module, supports the touch sensitive control module 544, which in a preferred embodiment is a touch screen 544.

Figure 43:
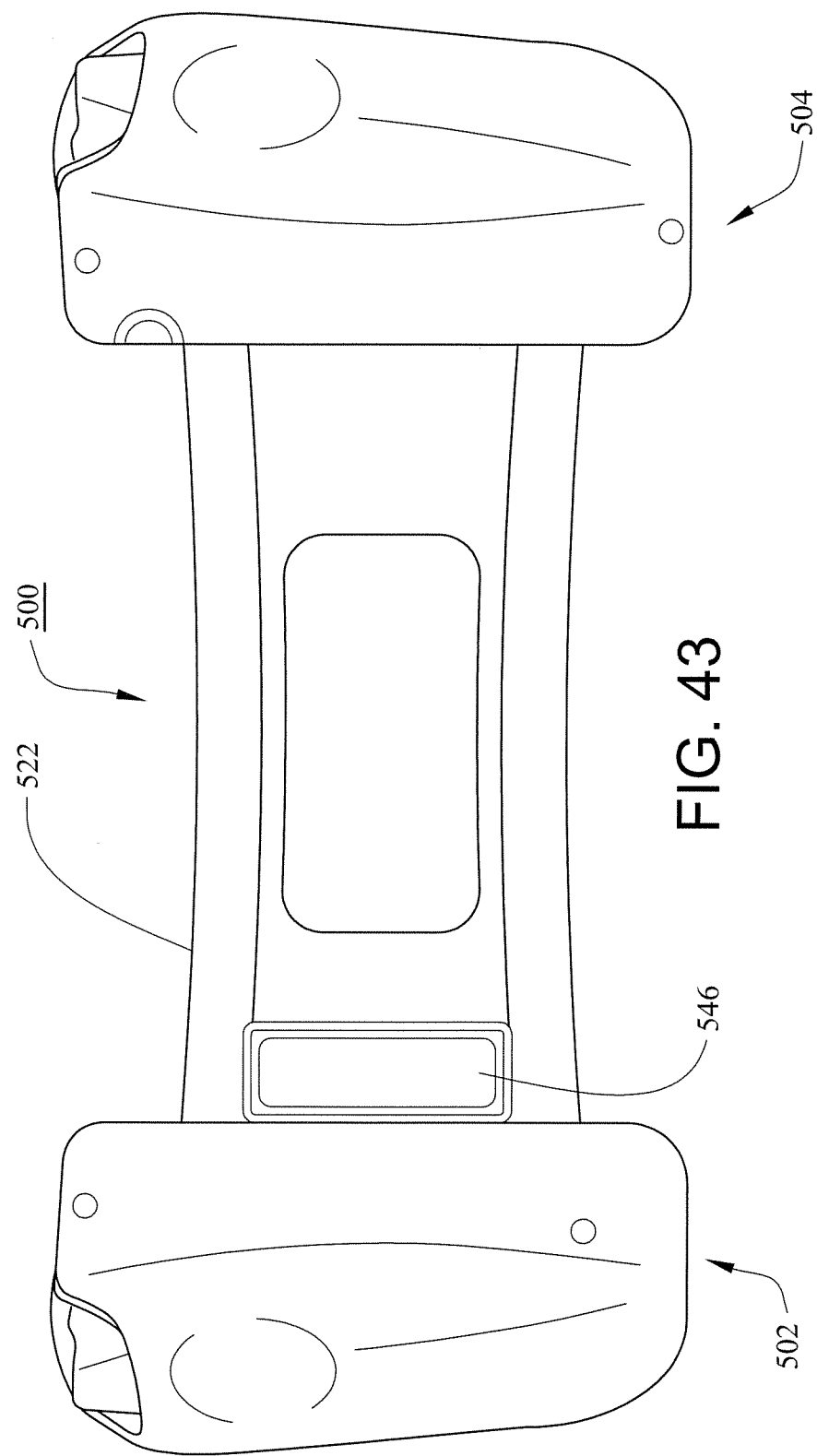
FIG. 43 shows a back view of the alternate, alternative embodiment of the electronic gaming system of FIG. 35, with a touch sensitive module attached to a back side of the structural bridge of the electronic gaming controller.

FIG. 43 discloses the electronic game control apparatus 500 (also referred to herein as an input device 500), which in a preferred embodiment provides the first control module 502, the second control module 504, and the structural bridge 522. In a preferred embodiment, a back of the structural bridge 522, supports a touch sensitive control module 546, which in a preferred embodiment is a touch screen 546.

Figure 44:
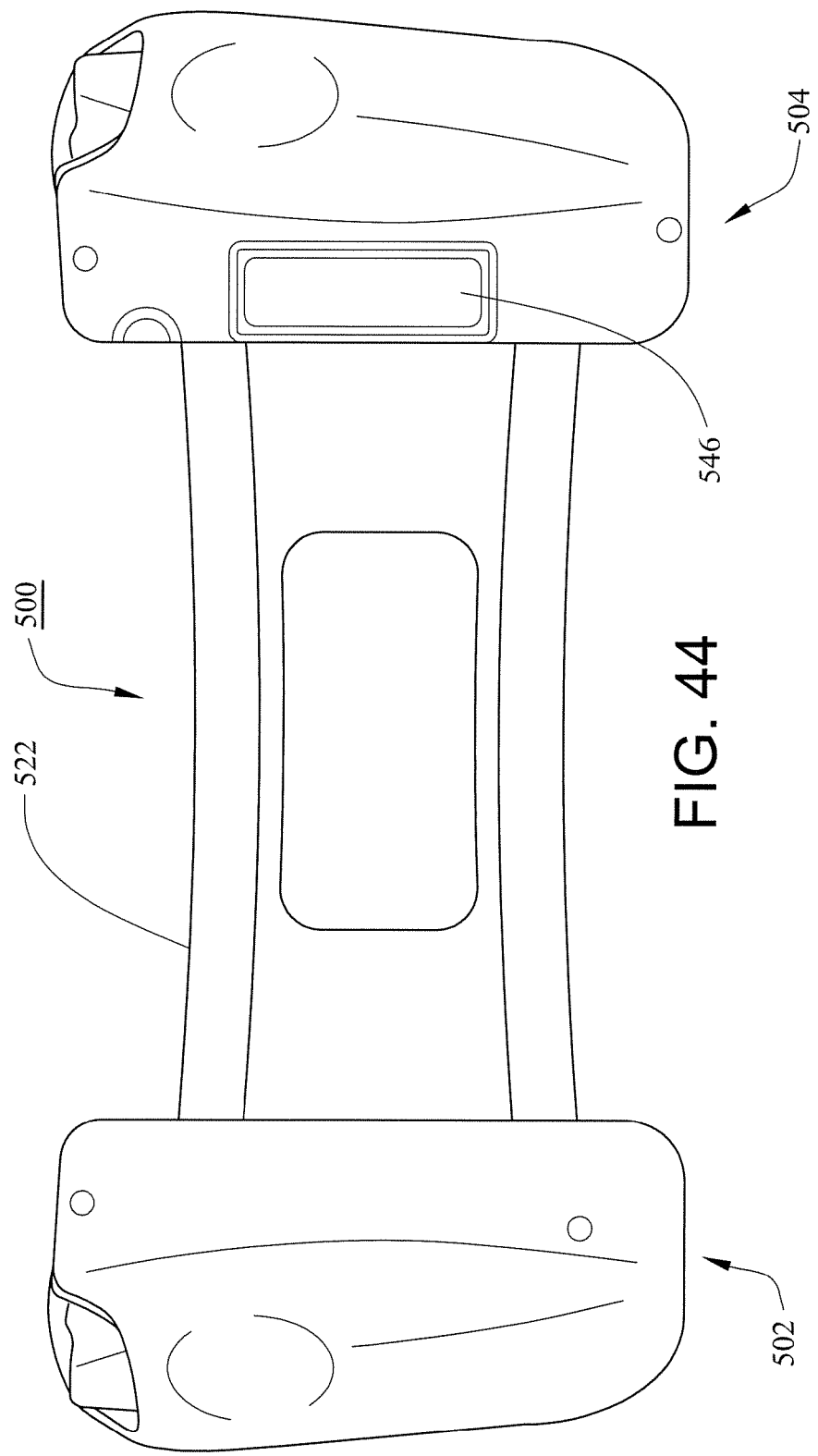
FIG. 44 shows a back view of an alternate, alternative embodiment of the electronic gaming system of FIG. 35, with a touch sensitive module attached to a back side of the control module of the electronic gaming controller.

FIG. 44 discloses the electronic game control apparatus 500 (also referred to herein as an input device 500), which in a preferred embodiment provides the first control module 502, the second control module 504, and the structural bridge 522. In a preferred embodiment, a back side of the second control module 504, supports the touch sensitive control module 546, which in a preferred embodiment is a touch screen 546.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular computing device without departing from the spirit and scope of the present invention.

What is claimed is:

1. A combination comprising:
a computing device, comprising an electronic display screen;
a pair of confinement structures, the pair of confinement structures interacting with the computing device and adjacent at least two opposing sides of the computing device, but not more than three sides of the sides of the computing device, the at least two opposing sides of the computing device support the electronic display screen, each of the pair of confinement structures comprising a communication link, each of the communication links configured for electronic communication with the computing device;
a rigid structural bridge disposed between the pair of confinement structures, the rigid structural bridge comprising a passageway between the pair of confinement structures, the passageway promotes electrical communication between the communication link of a first confinement structure of the pair of confinement structures and the computing device, the passageway further promotes electrical communication between the communication link of a second confinement structure of the pair of confinement structures and the computing device;
fastening mechanisms, the fastening mechanisms secures the first confinement structure to the rigid structural bridge, the fastening mechanisms further secure the second confinement structure to the rigid structural bridge; and
a pair of control modules, each control module of the pair of control modules interacting with a corresponding confinement structure of the pair of confinement structures, each control module in electronic communication with the communication link of its corresponding confinement structure, each of the pair of control modules providing input module apertures, each input module aperture secures an instructional input device, wherein said input module apertures are adjacent each of the at least two opposing sides of the computing device, and wherein the input device is a separate and distinct structure from the pair of confinement structures, forming no structural portion of the pair of confinement structures, and in which each of the pair of confinement structures are separate and distinct structures from the structural bridge, forming no structural portion of the structural bridge.

2. The combination of claim 1, in which the rigid structural bridge supports electronics associated with the computing device.

3. The combination of claim 2, in which the computing device further comprising a back, the back provides an internal surface, an external surface cooperates with the least two opposing sides of the computing device.

4. The combination of claim 3, in which the rigid structural bridge cooperates with the back of the computing device.

5. The combination of claim 4, in which the rigid structural bridge cooperating with the back of the computing device is adjacent to the external surface of the back of the computing device.

6. The combination of claim 4, in which each control module of the pair of control modules passes signals through its corresponding communication link to the computing device, the signals passed to the computing device controlling images displayed on the electronic display screen of the computing device.

7. The combination of claim 6, in which each control module of the pair of control modules is a game control module, and in which each game control module passes signals through its corresponding communication link to the computing device, the signals control images displayed on the electronic display screen of the computing device.

8. The combination of claim 2, in which the electronics supported by the rigid structural bridge is a communication module associated with the computing device.

9. The combination of claim 2, in which the rigid structural bridge, the pair of confinement structures, and the fastening mechanism form a communication port.

10. A combination comprising:
a computing device, the computing device provides an electronic display screen, the computing device having a length greater than its width;
an input device in electronic communication with the computing device, the input device providing a pair of control modules, the pair of control modules adjacent to and confining the computing device on at least two opposing sides of the computing device, the at least two opposing sides adjacent the electronic display screen and define end points of the length of the computing device, the pair of control modules adapt to and are in pressing contact with said end points of the length of the computing device, while the width of the computing device extends above and below the confines of the pair of control modules;

a structural bridge securing the pair of control modules one to the other, the structural bridge configured such that the structural bridge adapts to and is adjacent a back of the computing device, wherein a first of the pair of control modules comprising a retention mechanism communicating with the structural bridge, and wherein the retention mechanism secures the structural bridge to the first of the pair of control modules, such that the structural bridge accommodates the length of the computing device, and in which the structural bridge provides a void in the mid-section of the structural bridge, the void having right, left, upper, and lower sides, each side communicating with a material of the structural bridge; and a communication link, the communication link facilitates communication between the pair of control modules and the computing device, and wherein the structural bridge masks a portion of a mid-region of the back of the computing device.

11. The device of claim 10, in which the first of the pair of control modules further comprises a bottom cover, the bottom cover provides a position guide, and in which the retention mechanism comprises:

a attachment boss communicating with the structural bridge;

an attachment support cooperating with the attachment boss, the attachment support in cooperation with the attachment boss secures the structural bridge, the structural bridge disposed between the attachment boss and the attachment support; and a biasing structure communicating with the attachment support, the biasing structure provides tension between the structural bridge and the second of the pair of control modules.

12. The device of claim 11, in which the attachment support comprises a guide aperture interacting with the position guide, the interaction of the guide aperture with the position guide maintains alignment between the structural bridge and the second of the pair of control modules.

13. The device of claim 11, in which the input device is a game control module, and in which the game control module passes signals to the computing device, the signals control images displayed on the electronic display screen of the computing device.

14. The device of claim 11, in which the input device provides a keyboard module, and in which the keyboard module passes signals to the computing device, the signals control images displayed on the electronic display screen of the computing device.

15. The device of claim 11, in which the structural bridge is a flexible structure.

16. A combination comprising:

a first control module of a pair of control modules, and a second control module of the pair of control modules each the first and the second control modules comprising a plurality of input module apertures, each input module aperture supports an instructional input device, at least one of the first and the second control modules further comprising a fastening detent; and a structural bridge disposed between said first and second control module, said structural bridge comprising a first side, said first side of said structural bridge in contact adjacency with said first control module, said structural bridge further comprising a second side, said second side of said structural bridge in contact adjacency with said second control module, said structural bridge still further comprising a retention member, the retention member interacts with the fastening detent, the interaction of the fastening detent with the retention member restrains the structural bridge to a control module of the pair of control modules.

17. The combination of claim 16, further comprising a computing device, the computing device comprising an upper, lower, left and right side, collectively the sides of the computing device, the computing device disposed between and in contact adjacency with each the first and second control modules of the pair of control modules, the pair of control modules engaging the computing device on at least two opposing sides of the computing device, but not more than three sides of the sides of the computing device, said pair of control modules are separate and distinct structures from the computing device.

18. The combination of claim 17, in which the structural bridge is a rigid structural bridge, the rigid structural bridge comprising a signal pathway for use in passing signals from each said first and second control modules.

19. The combination of claim 18, in which the computing device further comprising a back, the back provides an internal surface, an external surface, and upper, lower, left and right sides, collectively the sides of the back of the computing device, the back of the computing device cooperating with the sides of the computing device, and in which the rigid structural bridge cooperates with the back of the computing device.

20. The combination of claim 19, in which said signal pathway of said rigid structural bridge is an optical conductor.

21. A combination comprising:

a computing device, the computing device providing an upper, lower, left and right side, collectively the sides of the computing device, and an electronic display screen, the electronic display screen having a corresponding side adjacent each of the sides of the computing device;

a pair of modules, the pair of modules adjacent to and confining the computing device on at least two opposing sides of the computing device, but not more than three sides of the sides of the computing device, a module of the pair of modules providing a communication link;

a structural bridge disposed between the pair of modules, the structural bridge includes, but is not limited to, a passageway between the pair of modules, and a fastening mechanism, the passageway promotes communication between the communication link and the computing device, while the fastening mechanism unifies a module of the pair of modules with the structural bridge, and in which the structural bridge provides a void in the midsection of the structural bridge, the void having right, left, upper, and lower sides, each side communicating with a material of the structural bridge; and a pair of instructional input devices, each instructional input device of the pair of instructional input devices interacting with a corresponding module of the pair of modules, each instructional input device in electronic communication with the communication link, each of the pair of instructional input devices adjacent a corresponding side of the at least two opposing sides of the sides of the computing device.

22. A combination comprising:
a pair of confinement structures;
a first communication link, the first communication link supported by a first confinement structure of the pair of confinement structures;
a second communication link, the second communication link supported by a second confinement structure of the pair of confinement structures;
a structural bridge disposed between the first confinement structure and the second confinement structure, the structural bridge comprising an electronics communications passageway between the first and second confinement structures;
fastening mechanisms, the fastening mechanisms secure each the first confinement structure and the second confinement structure of the pair of confinement structures to the structural bridge; and
a pair of control modules, a first control module of the pair of control modules attached to the first confinement structure, and a second control module of the pair of control modules attached to the second confinement structure, the first control module in electronic communication with the first communication link, the second control module in electronic communication with the second communication link, each the first and the second control modules comprising a plurality of input module apertures, each input module aperture secures an instructional input device, and in which neither the first nor the second control module form a structural portion of either the first or second confinement structures.

* * * * *

UNITED STATES PATENT AND TRADEMARK OFFICE
CERTIFICATE OF CORRECTION

PATENT NO.        : 9,855,498 B2
APPLICATION NO.   : 15/663171
DATED             : January 2, 2018
INVENTOR(S)       : Fraser Townley and Kelly D. Gamble Page 1 of 2

It is certified that error appears in the above-identified patent and that said Letters Patent is hereby corrected as shown below:

On the Title Page

In Related U.S. Application Data (and continued on page 2):
Should be corrected to:
"Continuation of application No. 15/457,571, filed on Mar. 13, 2017, now Pat. No. 9,757,649, which is a continuation-in-part of application No. 14/840,184, filed on Aug. 31, 2015, now Pat. No. 9,592,453, which is a continuation-in-part of application No. 14/611,804, filed on Feb. 2, 2015, now Pat. No. 9,126,119, which is a continuation-in-part of application No. 13/779,987, filed on Feb. 28, 2013, now Pat. No. 8,529,357, which is a continuation-in-part of application No. 13/681,153, filed on Nov. 19, 2012, now Pat. No. 8,944,912, which is a continuation-in-part of application No. 13/494,801, filed on Jun. 12, 2012, now Pat. No. 9,005,026."

In the Specification

In Column 1, in RELATED APPLICATIONS:
Should be corrected to:
"This application is a continuation of U.S. patent application Ser. No. 15/457,571, filed on Mar. 13, 2017, which is a continuation-in-part of U.S. patent application Ser. No. 14/840,184, filed on Aug. 31, 2015, which is a continuation-in-part of U.S. patent application Ser. No. 14/611,804, filed on Feb. 2, 2015, which is a continuation-in-part of U.S. patent application Ser. No. 13/779,987, filed on Feb. 28, 2013, which is a continuation-in-part of U.S. patent application Ser. No. 13/681,153, filed on Nov. 19, 2012, which is a continuation-in-part of U.S. patent application Ser. No. 13/494,801, filed on Jun. 12, 2012, which in turn claims priority to U.S. Provisional Patent application Ser. No. 61/577,703 filed on Dec. 20, 2011."

In the Claims

In Column 19, Line 27, Claim 11:
"bottom cover" should be "top cover"

Signed and Sealed this
Fifth Day of March, 2019

Andrei Iancu
*Director of the United States Patent and Trademark Office*

CERTIFICATE OF CORRECTION (continued)
U.S. Pat. No. 9,855,498 B2

In Column 19, Line 28, Claim 11:
"bottom cover" should be "top cover"

In Column 19, Line 45, Claim 12:
"second of the pair" should be "first of the pair"